United States Patent [19]

Kohyama et al.

[11] Patent Number: 5,260,382
[45] Date of Patent: Nov. 9, 1993

[54] ETHYLENE/PENTENE-1 COPOLYMER COMPOSITIONS

[75] Inventors: Masaki Kohyama; Masaya Yamada, both of Ichihara, Japan

[73] Assignee: Mitsui Petrochemical Industries, Ltd., Tokyo, Japan

[21] Appl. No.: 767,620

[22] Filed: Sep. 30, 1991

[30] Foreign Application Priority Data

Oct. 2, 1990 [JP] Japan ................. 2-265527

[51] Int. Cl.$^5$ .............. C08L 23/20; C08L 23/08; C08L 31/04
[52] U.S. Cl. .................. 525/222; 524/524; 526/348.6
[58] Field of Search .................. 525/240, 222

[56] References Cited

U.S. PATENT DOCUMENTS 4,590,124 5/1986 Schoenberg .............. 428/516
5,091,241 2/1992 Lang et al. .............. 428/516

FOREIGN PATENT DOCUMENTS 0092897 11/1983 European Pat. Off.
2052534 1/1981 United Kingdom.
2121062 12/1983 United Kingdom.

Primary Examiner—Carman J. Seccuro, Jr.
Attorney, Agent, or Firm—Birch, Stewart, Kolasch & Birch

[57] ABSTRACT

The ethylene/pentene-1 copolymer composition comprises an ethylene/pentene-1 copolymer satisfying specific request and an ethylene/vinyl acetate copolymer. This composition has excellent balance between impact resistance and tear properties, excellent transparency and good hot tack properties, and are particularly useful for packing films.

7 Claims, 2 Drawing Sheets

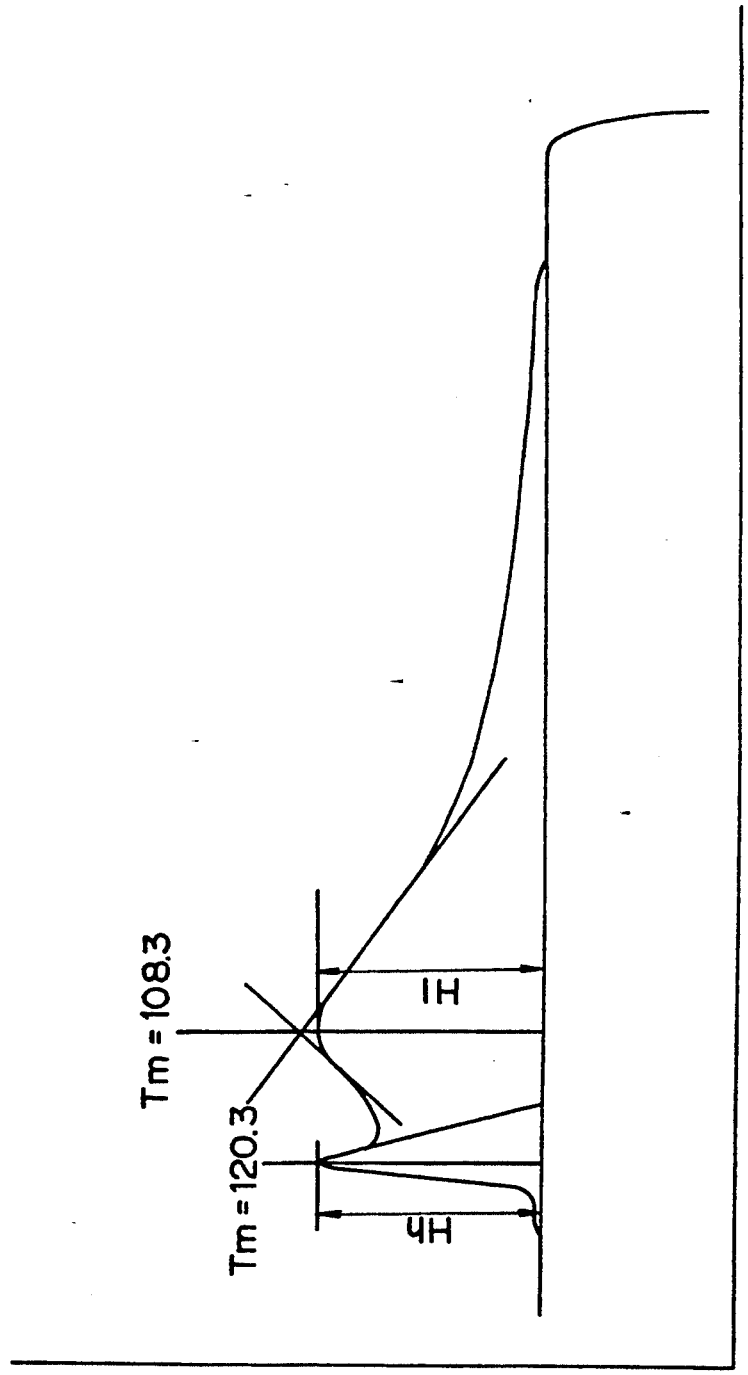

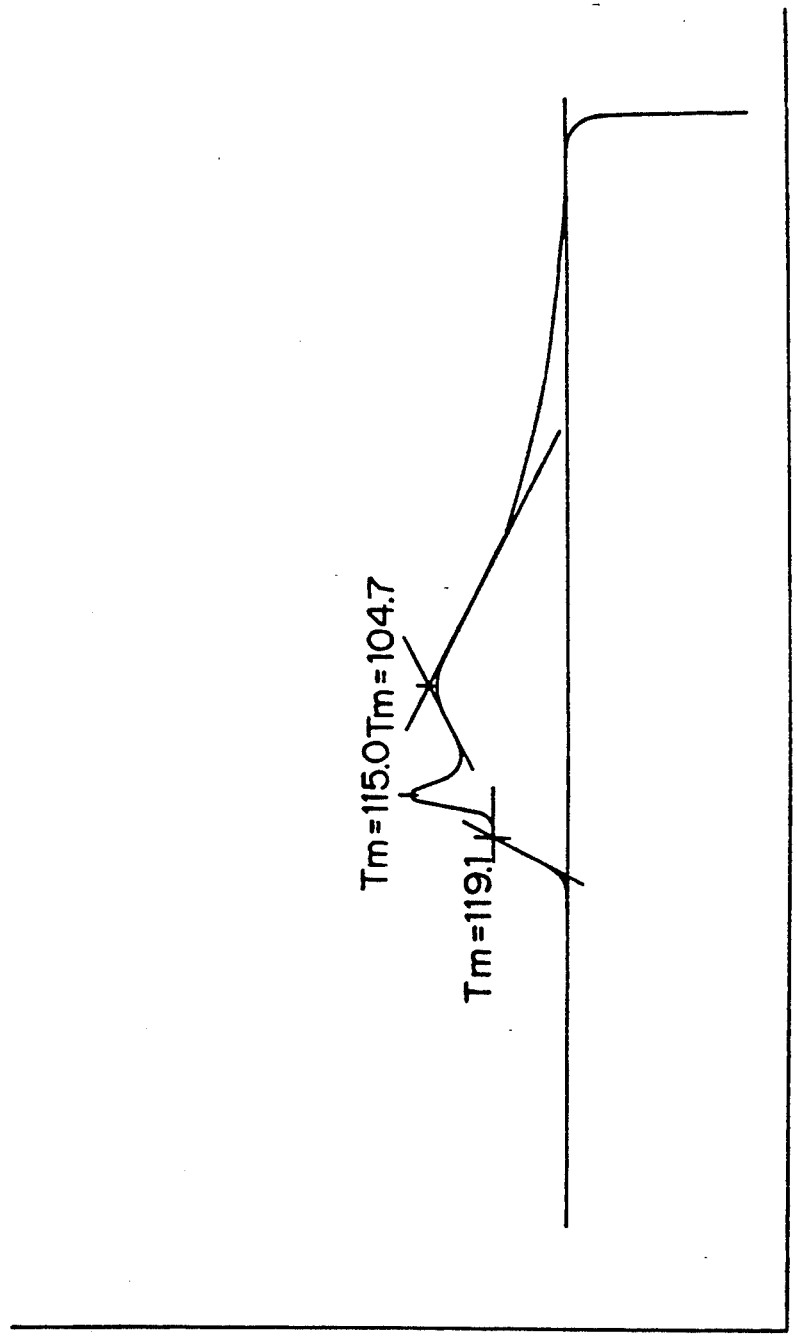

ETHYLENE/PENTENE-1 COPOLYMER COMPOSITIONS

BACKGROUND OF THE INVENTION

1. Field of the Invention

This invention relates to ethylene/pentene-1 copolymer compositions having an excellent balance between impact resistance and tear properties, excellent transparency and good hot tack properties, and are particularly useful for packaging films.

2. Discussion of Related Art

Polyethylene prepared by high-pressure process is known as one of the polyolefin resins having relatively high transparency, and has been widely used for application in films or hollow containers. Speaking about the use of polyethylene in film, however, the high-pressure polyethylene, when molded into film by air-cooled inflation process often used in common film formation, cannot give products having sufficient transparency, impact resistance and tear resistance. There has been adopted a process for the copolymerization of ethylene with other polymerizable monomers such as vinyl acetate in order to improve these drawbacks. This process, however, undesirably brings about such problems that the film resulting from the ethylene copolymer prepared thereby decreases in mechanical strength and rigidity, or said film is liable to undergo blocking, thereby throwing hindrances in the way of the molding operation.

By the way, a copolymer of ethylene and $\alpha$-olefin of at least 3 carbon atoms prepared by using a Ziegler catalyst is known as a resin excellent in mechanical strength and having a density nearly equal to that of the high-pressure polyethylene. Generally, ethylene/$\alpha$-olefin copolymers prepared by using a vanadium-based catalyst as the Ziegler catalyst have a low melting point, and hence heat resistance and mechanical strength come into question.

An ethylene/$\alpha$-olefin copolymer prepared by using a mixture of a titanium-based solid catalyst with an organoaluminum compound catalyst component as the Ziegler catalyst, on the other hand, has a high melting point and excellent heat resistance in comparison with the above-mentioned ethylene/$\alpha$-olefin copolymer prepared by using the vanadium-based catalyst. However, when this ethylene/$\alpha$-olefin copolymer prepared by using the above-mentioned mixture as the Ziegler catalyst contains structural units derived from propylene of 3 carbon atoms or butene-1 of 4 carbon atoms as the $\alpha$-olefin, the mechanical strength of said copolymer comes into question. On that account, the $\alpha$-olefin used in this ethylene/$\alpha$-olefin copolymer is selected from among $\alpha$-olefin having at least 6 carbon atoms in order to obtain sufficient mechanical strength of the resulting copolymer. Although a film obtained from a copolymer of ethylene and $\alpha$-olefin having at least 6 carbon atoms is excellent in impact strength, the film has such problems that because of its tear strength higher than that required, it does not tear easily and becomes poor in tear properties (poor in peeling properties).

The present inventors have already found that a resin having both excellent impact strength and appropriate tear strength, i.e. excellent tear properties, may be obtained by copolymerizing ethylene and pentene-1 of 5 carbon atoms using a titanium solid catalyst component and an organoaluminum compound catalyst component.

The resulting resin, however, has still insufficient hot tack properties which are an index of resistance to peeling strength applied to a heat sealed part thereof directly after heat sealing, and therefore sufficient attention must be paid to the control of a packaging speed, appropriate temperature, etc., when the resin is used for automated filling and packaging. The resin tends to have insufficient transparency when polymerization is carried out with some catalyst systems. There is, therefore, still room for improving the problems as mentioned above.

OBJECT OF THE INVENTION

An object of the present invention is to provide ethylene/pentene-1 copolymer compositions having improved transparency and hot tack properties without impairing the balance between excellent impact resistance and tear properties which are the excellent characteristics of the ethylene-pentene-1 copolymer.

SUMMARY OF THE INVENTION

An ethylene/pentene-1 copolymer composition according to the present invention is characterized by containing 95~65 parts by weight of (A) an ethylene/pentene-1 copolymer obtained by copolymerization of ethylene and pentene-1, said ethylene/pentene-1 copolymer satisfying the following requisites (a) to (d):

(a) a melt flow rate of the copolymer as measured according to ASTM D 1238E is 0.01-100 g/10 min, (b) a density of the copolymer as measured according to ASTM D 1505 is 0.87-0.96 g/cm$^3$.

(c) the copolymer contains 1-25% by weight of a structural unit derived from pentene-1, and (d) in a film 40 $\mu$m in thickness obtained by cast film extrusion of the copolymer, the ratio (RS) of impact strength of the film to tear strength of the film in the take-off direction of the film satisfies the following formula:

$$RS \geq -20\log MFR - 1000d + 968$$

wherein MFR represents a melt flow rate of said copolymer, and d represents the density of said copolymer, and 5~35 parts by weight of (B) an ethylene/vinyl acetate copolymer.

BRIEF DESCRIPTION OF THE DRAWINGS

FIG. 1 is a DSC melt-peak pattern obtained by measuring under usual measuring conditions "an ultra-slowly cooled sample" of the ethylene/pentene-1 copolymer used in the present invention.

FIG. 2 is a DSC melt-peak pattern obtained by measuring under usual measuring conditions a usual-slowly cooled sample of the ethylene/pentene-1 copolymer used in the present invention.

DETAILED DESCRIPTION OF THE INVENTION

The ethylene/pentene-1 copolymer compositions according to the present invention are concretely illustrated below.

Ethylene/Pentene-1 Copolymer (A)

The ethylene/pentene-1 copolymers (A) used in the compositions of the invention are illustrated below in detail.

The ethylene/pentene-1 copolymers (A) comprise a structural unit derived from ethylene and a structural unit derived from pentene-1.

The ethylene/pentene-1 copolymers (A) comprise a structural unit derived from pentene-1 in an amount from 1 to by weight, preferably from 4 to 23% by weight and especially from 6 to 20% by weight. The ethylene/pentene-1 copolymers (A) may be a copolymer formed from ethylene and pentene-1, or may further be a multi-component copolymer in which polymerizable components other than ethylene and pentene-1 are used, so long as the use of other components does not impair the characteristics of the copolymers (A). In the case where the copolymers (A) are of a binary system, the copolymers (A) contain 75 to 99% by weight of ethylene structural units as an inevitable consequence. Further, the content is preferably from 77 to 96% by weight and especially from 80 to 94% by weight corresponding to the content of pentene-1 structural units. In the case where the ethylene/pentene-1 copolymers are multi-component copolymers, the copolymers (A) have the content of structural units, which are derived from $\alpha$-olefins other than ethylene and pentene-1 or polyenes, of usually up to 10% by weight, preferably up to 5% by weight and especially up to 3% by weight. Examples of other $\alpha$-olefins mentioned above include propylene, 2-methylpropylene, butene-1, hexene-1, 4-methylpentene-1, 3-methylpentene-1, octene-1, nonene-1, decene-1, undecene-1 and dodecene-1. Examples of the above-mentioned polyenes include butadiene, isoprene, 1,4-hexadiene, dicyclopentadiene and 5-ethylidene-2-norbornene.

The ethylene/pentene-1 copolymers [A] having structural units as mentioned above have a melt flow rate (MFR) of 0.01 to 100 g/10 min. Further, those copolymers (A) having MFR of 0.05 to 50 g/10 min are particularly preferably used. That is to say, when the MFR is less than 0.01 g/10 min, the resulting compositions lower their moldability, and at the same time molded articles such as films formed from the compositions lower their transparency. Furthermore, when MFR exceeds 100 g/10 min, the films lower their mechanical strength. MFR mentioned above is determined according to ASTM D 1238E.

The ethylene/pentene-1 copolymers [A] are required to have a density of from 0.87 to 0.96 g/cm³ and those copolymers (A) having a density of 0.88 to 0.94 g/cm³ are preferably used. The density mentioned above is determined according to ASTM D 1505.

The ethylene/pentene-1 copolymers (A) are copolymers having relatively highly crystalline properties. That is, the copolymers (A) have a crystallinity index as measured by X-ray diffraction of usually not less than 25%, preferably not less than 30%. The ethylene/pentene-1 copolymers (A), therefore, have a melting point, and the melting point is usually 110°–125° C., preferably 112°–123° C.

The ethylene/pentene-1 copolymers (A) used for the compositions of the invention have various characteristics as mentioned above. The copolymers (A) are also required to have a ratio (RS) of the impact strength of the film 40 μm in thickness, which is obtained by cast film extrusion of the copolymers (A), to tear strength thereof in the take-off direction represented by the following formula $$RS \geq -20\log MFR - 1000d + 968 \qquad [1]$$

wherein MFR is the melt flow rate of the copolymers (A), and d is the density of the copolymer. That is, RS of the copolymers (A) is required to exceed a certain value in relation to MFR and density thereof as mentioned in the above formula [1]. As described above, RS is the ratio of the impact strength of a test film to the tear strength thereof in the take-off direction, namely the value of an impact strength/tear strength ratio.

When there is used an ethylene/pentene-1 copolymer whose ratio (RS) of the impact strength to the tear strength is at least the value of ($-20\log MFR - 1000d + 968$), films prepared from the compositions of the invention exhibit a very good balance between the impact strength and tear strength. That is, when an ethylene/pentene-1 copolymer (A) having RS satisfying the above-mentioned formula [1] and an ethylene/vinyl acetate copolymer (B) as will be mentioned later are used for the compositions of the invention, the resulting molded products can solve problems associated with conventional packaging materials, such as a packaging material having a high impact strength but poor tear properties or a packaging material having good tear properties but a low impact strength.

Furthermore, the compositions of the invention having a better balance between the impact strength and tear properties can be obtained by using the copolymers (A) having RS represented by the formula [1']

$$RS \geq -20\log MFR - 1000d + 973 \qquad [1']$$

and especially $$200 \geq RS \geq -20\log MFR - 1000d + 975 \qquad [1''].$$

The film 40 μm in thickness used for the determination of the RS value is a film prepared from the ethylene/pentene-1 copolymer (A) under the conditions mentioned below.

That is, the film is formed by means of a T-die film-forming machine equipped with an extruder 65 mm in diameter under a resin temperature at die of 220° to 240° C., a chill roll temperature of 30° to 40° C., a film-forming rate of 20 to 40 m/min (film thickness 40 μm), and a draft ratio (film thickness/lip opening (mm)) of 0.05 to 0.07.

The cast film 40 μm in thickness obtained by processing the ethylene/pentene-1 copolymer (A) having the above-mentioned properties in the manner mentioned above has an impact strength of usually at least 1000 kg·cm/cm, preferably at least 1200 kg·cm/cm.

It is preferable that the tear strength ($T_{MD}$) of said film in the take-off direction and the melt flow rate (MFR) of the ethylene/pentene-1 copolymer used for said film fulfills a relationship therebetween represented by the following formula [2]

$$\log T_{md} \leq -0.37\log MFR - 5.1d + 6.72 \qquad [2]$$

wherein d represents the density of the copolymer, preferably $$\log T_{MD} \leq -0.37\log MFR - 5.1d + 6.65 \qquad [2']$$

and especially $$\log T_{MD} \leq -0.37 \log MFR - 5.1d + 6.59 \quad [2'']$$

The compositions of the invention capable of producing films excellent in impact strength as well as tear properties can be easily obtained from the ethylene/pentene-1 copolymers (A) which fulfill the relationship represented by the above-mentioned formula [2] between the tear strength ($T_{MD}$) of the film and MFR.

Pressed sheets 2 mm in thickness obtained by molding the above-mentioned ethylene/pentene-1 copolymers (A) according to ASTM D 1928 have stress cracking resistance (SC resistance (ESCR) measured according to ASTM D 1692, antalocks 100%, 50° C.) of at least 10 hr, and satisfy the relationship represented by the following formula [3-a]

$$ESCR \geq 0.7 \times 10^4 (\log 80 - \log MFR)^3 (0.952 - d) \quad [3\text{-}a]$$

wherein $2.0 \leq MFR \leq 50$, and d is the density of the copolymer, preferably $$ESCR \geq 0.9 \times 10^4 (\log 80 - \log MFR)^3 (-0.952 - d) \quad [3'\text{-}a]$$

and especially $$ESCR \geq 1.1 \times 10^4 (\log 80 - \log MFR)^3 (0.952 - d) \quad [3''\text{-}a].$$

Further, pressed sheets 2 mm in thickness obtained by molding the ethylene/pentene-1 copolymers (A) according to ASTM D 1928 have stress cracking resistance (SC resistance (ESCR) measured according to ASTM D 1692, antalocks 10%, 50° C.) of at least 20 hr, and satisfy the relationship represented by the following formula [3-b]

$$ESCR \geq 1.4 \times 10^4 (\log 40 - \log MFR)^2 (0.952 - d) \quad [3\text{-}b]$$

wherein $1.0 \leq MFR \leq 20$, and d represents the density of the copolymer, preferably $$ESCR \geq 1.7 \times 10^4 (\log 40 - \log MFR)^2 (0.952 - d) \quad [3'\text{-}b]$$

and especially $$ESCR \geq 2.0 \times 10^4 (\log 40 - \log MFR)^2 (0,.952 - d) \quad [3''\text{-}b].$$

Furthermore, pressed sheets 2 mm in thickness obtained by molding the ethylene/pentene-1 copolymers (A) according to ASTM D 1928 have stress cracking resistance (SC resistance (ESCR) measured according to ASTM D 1692, antalocks 10%, 60° C.) of at least 50 hr, and satisfy the relationship represented by the following formula [3-c]

$$ESCR \geq 0.50 \times 10^4 (\log 100 - \log MFR)(0.952 - d) \quad [3\text{-}c]$$

wherein $0.1 \leq MFR \leq 5$, and d represents the density of the copolymer, preferably $$ESCR \geq 0.65 \times 10^4 (\log 100 - \log MFR)(0.952 - d) \quad [3'\text{-}c]$$

and especially $$ESCR \geq 0.80 \times 10^4 (\log 100 - \log MFR)(0.952 - d) \quad [3''\text{-}c].$$

Moreover, it is preferable that the haze (HAZE) of the above-mentioned pressed sheets of 0.5 mm in thickness and the melt flow rate (MFR) of the ethylene/pentene-1 copolymers (A) satisfy the relationship represented by the following formula 4]

$$\log HAZE \leq 15d - 0.45 \log MFR - 12.23 \quad [4]$$

wherein d represents the density of the copolymer, preferably $$\log HAZE \leq 15d - 0.45 \log MFR - 12.26 \quad [4']$$

and especially $$\log HAZE \leq 15d - -0.45 \log MFR - 12.30 \quad [4''].$$

The pressed sheets 0.5 mm in thickness used for the measurement of the above-mentioned physical properties are prepared from the ethylene/pentene-1 copolymers (A) according to ASTM D 1928.

The measurement of HAZE is conducted according to ASTM D 1003.

When the ethylene/pentene-1 copolymers (A), the pressed sheets of which satisfy the above-mentioned relationship between stress cracking resistance and haze, are used, the resulting compositions are capable of giving molded articles which are transparent and which hardly cause environmental stress cracking, that is, the content leakage trouble hardly arises, in a case where said compositions are molded into articles by injection molding, rotary molding or inflation molding.

The ethylene/pentene-1 copolymers having properties as mentioned above can be prepared by copolymerizing ethylene and pentene-1, and if necessary other reactive monomers by various methods.

As concrete examples of the processes for the preparation of the ethylene/pentene-1 copolymers (A), there may be mentioned three processes embodied. The ethylene/pentene-1 copolymers obtained by the above-mentioned three embodiments are called, for convenience, the ethylene/pentene-1 copolymers [I], [II] and [III], respectively. In the present invention, however, there may be used not only the above-mentioned copolymers [I], [II] and [III] but also mixtures thereof or ethylene/pentene-1 copolymers obtained by processes other than the above-mentioned three processes.

The ethylene/pentene-1 copolymers [I] are illustrated below with respect to their physical properties, followed by illustration of the process for the preparation thereof.

The ethylene/pentene-1 copolymers [I] used in the invention have a melt flow rate (MFR) of 0.01 to 100 g/10 min, preferably 0.05 to 50 g/10 min as measured according to ASTM D 1238E. When this MFR of the copolymer is less than 0.01 g/10 min, said copolymer lowers its moldability, and the molded product such as a film obtained therefrom tends to decrease in transparency. When MFR of the copolymer exceeds 100 g/10 min, said copolymer tends to decrease in mechanical strength.

The ethylene/pentene-1 copolymers [I] used in the invention have a density of 0.87 to 0.96 g/cm³, preferably 0.88 to 0.94 g/cm3 as measured according to ASTM D 1505.

The ethylene/pentene-1 copolymers [I] used in the invention contain structural units derived from pentene-1 in an amount of 1 to 25% by weight, preferably 4 to 23% by weight and especially 6 to 20% by weight, and structural units derived from ethylene in an amount of 75 to 99% by weight, preferably 77 to 96% by weight and especially 80 to 94% by weight.

The ethylene/pentene-1 copolymers [I] may contain, as mentioned above, structural units derived from α-olefins other than ethylene and pentene-1 in an amount of up to 10% by weight, preferably up to 5% by weight and especially up to 3% by weight.

The ratio (RS) of the impact strength of a film 40 μm in thickness, which is obtained by cast film extrusion of the ethylene/pentene-1 copolymer [I] having the above-mentioned properties, to tear strength thereof in the take-off direction is represented by the following formula $$RS \geq -20\log MFR - 1000d + 968 \quad [1]$$

wherein MFR is the melt flow rate of the copolymer and d is the density of the copolymer, preferably $$RS \geq -20\log MFR - 1000d + 973 \quad [1']$$

and especially $$200 \geq RS \geq -20\log MFR - 1000d + 975 \quad [1''].$$

When the ratio (RS) of the impact strength to the tear strength in the above-mentioned film is less than (20log MFR − 1000d + 968), the film tends to be poor in tear properties, though it has a high impact strength, or the film tends to be poor in impact strength, though it has good tear properties. The film 40 μm in thickness used for the determination of the RS value is a film prepared from the ethylene/pentene-1 copolymer [I] under the conditions mentioned below.

That is, the film was formed by means of a T-die film-forming machine equipped with an extruder 65 mm in diameter using a resin temperature at die of 220° to 240° C., a chill roll temperature of 30° to 40° C., a film-forming rate of 20 to 40 m/min (film thickness 40 μm) and a draft ratio (film thickness/lip opening (mm)) of 0.05 to 0.07.

The cast film 40 μm in thickness obtained by processing the ethylene/pentene-1 copolymer [I] having the above-mentioned properties in the manner mentioned above has an impact strength of usually at least 1000 kg·cm/cm, preferably at least 1200 kg·cm/cm.

It is preferable that the tear strength ($T_{MD}$) of said film in the take-off direction and the melt flow rate (MFR) of the ethylene/pentene-1 copolymer fulfills the relationship therebetween represented by the following formula [2]

$$\log T_{MD} \leq 0.37\log MFR - 5.1d + 6.72 \quad [2]$$

wherein d represents the density of the copolymer, preferably $$\log T_{MD} \leq -0.37\log MFR - 5.1d + 6.65 \quad [2']$$

and especially $$\log T_{MD} \leq -0.37\log MFR - 5.1d + 6.59 \quad [2''].$$

Films excellent in impact strength as well as tear properties can be obtained from the ethylene/pentene-1 copolymers [I] which fulfill the relationship represented by the above-mentioned formula [2] between the tear strength ($T_{MD}$) of the film and MFR.

Pressed sheets 2 mm in thickness obtained by molding the above-mentioned ethylene/pentene-1 copolymers [I] according to ASTM D 1928 have stress cracking resistance (SC resistance (ESCR) measured according to ASTM D 1692, antalocks 100%, 50° C.) of at least 10 hr, and satisfy the relationship represented by the following formula [3-a]

$$ESCR \geq 0.7 \times 10^4 (\log 80 - \log MFR)^3 (0.952 - d) \quad [3\text{-}a]$$

wherein $2.0 \leq MFR \leq 50$, and d is the density of the copolymer, preferably $$ESCR \leq 0.9 \times 10^4 (\log 80 - \log MFR)^3 (0.952 - d) \quad [3'\text{-}a]$$

and especially $$ESCR \geq 1.1 \times 10^4 (\log 80 - \log MFR)^3 (0.952 - d) \quad [3''\text{-}a].$$

Further, pressed sheets 2 mm in thickness obtained by molding the ethylene/pentene-1 copolymers [I] according to ASTM D 1928 have stress cracking resistance (SC resistance (ESCR) measured according to ASTM D 1692, antalocks 10%, 50° C.) of at least 20 hr, and satisfy the relationship represented by the following formula [3-b]

$$ESCR \geq 1.4 \times 10^4 (\log 40 - \log MFR)^2 (0.952 - d) \quad [3\text{-}b]$$

wherein $1.0 \leq MFR \leq 20$, and d represents the density of the copolymer, preferably $$ESCR \geq 1.7 \times 10^4 (\log 40 - \log MFR)^2 (0.952 - d) \quad [3'\text{-}b]$$

and especially $$ESCR \geq 2.0 \times 10^4 (\log 40 - \log MFR)^2 (0.952 - d) \quad [3''\text{-}b].$$

Furthermore, pressed sheets 2 mm in thickness obtained by molding the ethylene/pentene-1 copolymers [I] according to ASTM D 1928 have stress cracking resistance (SC resistance (ESCR) measured according to ASTM D 1692, antalocks 10%, 60° C.) of at least 50 hr and satisfy the relationship represented by the following formula [3-c]

$$ESCR \geq 0.50 \times 10^4 (\log 100 - \log MFR)(0.952 - d) \quad [3\text{-}c]$$

wherein $0.1 \leq MFR \leq 5$, and d represents the density of the copolymer, preferably $$ESCR \geq 0.65 \times 10^4 (\log 100 - \log MFR)(0.952 - d) \quad [3'\text{-}c]$$

and especially $$ESCR \geq 0.80 \times 10^4 (\log 100 - \log MFR)(0.952 - d) \quad [3''\text{-}c].$$

Moreover, it is preferable that the haze (HAZE) of the above-mentioned pressed sheets and the melt flow rate (MFR) of the ethylene/pentene-1 copolymers [I] satisfy the relationship represented by the following formula [4]

$$\log HAZE \leq 15d - 0.45\log MFR - 12.23 \text{ J} \quad [4]$$

wherein d represents the density of the copolymer, preferably $$\log HAZE \leq 15d - 0.45\log MFR - 12.26 \quad [4']$$

and especially $$\log \text{HAZE} \leq 15d - 0.45\log \text{MFR} - 12.30 \quad [4''].$$

The pressed sheets 0.5 mm in thickness used for the measurement of the above-mentioned physical properties are prepared from the ethylene/pentene-1 copolymers (A) according to ASTM D 1928.

The measurement of HAZE is conducted according to ASTM D 1003.

The ethylene/pentene-1 copolymers [I], the pressed sheets of which satisfy the above-mentioned relationship between stress cracking resistance and haze, are capable of giving molded articles which are transparent and which hardly cause environmental stress cracking, that is, the content leakage trouble hardly arises, when said copolymers are molded into articles by injection molding, rotary molding or inflation molding.

The process for the preparation of the ethylene/pentene-1 copolymers [I] having the above-mentioned characteristics is illustrated hereinafter.

The ethylene/pentene-1 copolymers [I] used in the invention may be prepared, for example, by copolymerization of ethylene and pentene-1 in the presence of such olefin polymerization catalysts as mentioned below.

The olefin polymerization catalysts used for the preparation of the ethylene/pentene-1 copolymers [I] used in the invention are, for example, those disclosed by the present applicant in Japanese Patent L-O-P Publn. No. 811/1981. The disclosed olefin polymerization catalysts comprise

[A] a solid titanium catalyst component containing magnesium, titanium, halogen and an electron donor as its essential ingredients and obtained by bringing (i) a magnesium compound in a liquid state having no reducing ability and (ii) a titanium compound in a liquid state into contact, as they are, with each other, said contact being carried out in the presence of (iii) an electron donor having no active hydrogen or being followed by contact with said (iii), and

[B] an organic compound catalyst component of a metal belonging to Group I to III of the periodic table.

The magnesium compounds having no reducing ability referred to herein, that is, magnesium compounds having no magnesium-carbon bond or no magnesium-hydrogen bond, which are used in the preparation of the solid titanium catalyst component [A] as mentioned above, may be those derived from magnesium compounds having reducing ability. Such magnesium compounds having no reducing ability as mentioned above include magnesium halides such as magnesium chloride, magnesium bromide, magnesium iodide or magnesium fluoride;

alkoxymagnesium halides such as methoxymagnesium chloride, ethoxymagnesium chloride, isopropoxymagnesim chloride, butoxymagnesium chloride or octoxymagnesium chloride;

aryloxymagnesium halides such as phenoxymagnesium chloride or metylphenoxymagnesim chloride;

alkoxymagnesium such as ethoxymagnesium, isopropoxymagnesium, butoxymagnesium, n-octoxymagnesium or 2-ethylhexoxymagnesiunm;

aryloxymagnesim such as phenoxymagnesium or dimethylphenoxymagnesium; and magnesium carboxylate such as magnesium laurate or magnesium stearate.

The magnesium compounds having no reducing ability exemplified above may be those derived from magnesium compounds having reducing ability or those derived at the time of preparation of the catalyst component. The magnesium compounds having no reducing ability may be derived from the magnesium compounds having reducing ability, for example, by bringing said magnesium compounds having reducing ability into contact with polysiloxane compounds, halogen-containing silane compounds, halogen-containing aluminum compounds or compounds such as esters and alcohols.

The magnesium compounds having reducing ability as referred to herein may include, for example, those having a magnesium-carbon bond or magnesium-hydrogen bond. Concrete examples of such magnesium compounds as having reducing ability include dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butylethoxymagnesium, ethylbutylmagnesium, octylbutylmagnesium, butylmagnesium, hydride, etc.

Besides the above-exemplified magnesium compounds having reducing ability or having no reducing ability, the magnesium compounds used in the present invention may also be complex or composite compounds of the above-exemplified magnesium compounds with other metals, or mixtures of the above-exemplified compounds and other metal compounds. Further, the magnesium compounds used herein may also be mixtures of two or more of these compounds as mentioned above in combination.

Of these magnesium compounds exemplified above, preferred are those having no reducing ability, particularly halogen-containing magnesium compounds. Of the halogen-containing magnesium compounds, preferred are magnesium chloride, alkoxymagnesium chloride and aryloxymagnesium chloride.

The magnesium compound (i) in a liquid state used in the preparation of the solid titanium catalyst component [A] is suitably a solution of the magnesium compounding a hydrocarbon solvent, electron donor or a mixture thereof in which said magnesium compound is soluble. The hydrocarbon solvents used for this purpose include aliphatic hydrocarbons such as pentane, hexane, heptane, octane, decane, dodecane, tetradecane and kerosine;

alicyclic hydrocarbons such as cyclopentane, methylcylopentane, cyclohexane, methylcyclohexane, cyclooctane and cyclohexene;

aromatic hydrocarbons such as benzene, toluene, xylene, ethylbenzene, cumene and cymene; and halogenated hydrocarbons such as dichloroethane, dichloropropane, trichcloroethylene, carbon tetrachloride and dichlorobenzene.

The solution of the magnesium compound in the hydrocarbon solvent as mentioned above may be obtained by various methods, though they vary according to the kind of the magnesium compound and that of the solvent used, including for example, a method in which the magnesium compound is mixed simply with the solvent, a method in which a mixture of the magnesium compound and the solvent is heated, and a method in which the magnesium compound is added to an electron donor in which said magnesium compound is soluble, for example, an alcohol, aldehyde, amine or carboxylic acid, any mixture thereof, or a mixture of said mixture with another electron donor, followed by heating if necessary. For example, when a halogen-containing magnesium compound is dissolved in a hydrocarbon solvent by using an alcohol, the alcohol is used in an amount of at least 1 mole, preferably from about 1 to about 20 moles and especially from about 1.5 to about 12 moles per mole of the halogen-containing magnesium compound used, though the amount of the alcohol used varies according to the kind and amount of the hydrocarbon solvent used and according to the kind of the magnesium compound used. When aliphatic hydrocarbons and/or alicyclic hydrocarbons are used as the hydrocarbon solvents, the alcohol is used in the proportion as defined above. In that case, it is particularly preferable to use an alcohol of 6 or more carbon atoms in an amount of at least about 1 mole, preferably at least about 1.5 moles per mole of the halogen-containing magnesium compound used because the halogen-containing magnesium compound can be solubilized by the use of a relatively small amount of the alcohol, and because the resulting catalyst component has high catalytic activity. In that case, when an alcohol of up to 5 carbon atoms is used alone, it is necessary to use at least about 15 moles of the alcohol per mole of the halogen-containing magnesium compound used, and the catalytic activity of the resulting catalyst component is inferior to that attained in the system mentioned above. On the one hand, when aromatic hydrocarbons are used as the hydrocarbon solvents, it is possible to solubilize the halogen-containing magnesium compound by the use of the alcohol in the amount as defined above, irrespective of the kind of alcohol used.

Contact between the halogen-containing magnesium compound and alcohol is preferably effected in the hydrocarbon solvent at a temperature of usually at least room temperature and, according to the kind of the hydrocarbon solvent used, at a temperature of about 65° C., preferably about 80° to about 300° C. and especially about 100° to about 200° C. for a period of from 15 minutes to 5 hours, preferably from 30 minutes to 2 hours. Preferred alcohols having at least 6 carbon atoms include, for example, aliphatic alcohols such as 2-methylpentanol, 2-ethylbutanol, n-heptanol, n-octanol, 2-ethylhexanol, decanol, dodecanol, tetradecyl alcohol, undecanol, oleyl alcohol and stearyl alcohol;

aromatic alcohols such as benzyl alcohol, methylbenzyl alcohol, isopropylbenzyl alcohol, α-methylbenzyl alcohol and α,60 -dimethylbenzyl alcohol;

and aliphatic alcohols containing alkoxy group such as n-butyl cellosolve or 1-butoxy-2-propanol.

Examples of other alcohols include those having up to 5 carbon atoms, such as methanol, ethanol, propanol, butanol, ethylene glycol and methylcarbitol.

When a carboxylic acid is used, preferred are organic carboxylic acids having at least 7 carbon atoms, for example, caprylic acid, 2-ethylhexanoic acid, undecylenic acid, nonylic acid and octanoic acid.

When an aldehyde is used, preferred are those having at least 7 carbon atoms, for example, capric aldehyde, 2-ethylhexyl aldehyde and undecylic aldehyde.

When an amine is used, preferred are those having at least 6 carbon atoms, for example, heptylamine, octylamine, nonylamine, decylamine, laurylamine, undecylamine and 2-ethylhexylamine. When the carboxylic acids, aldehydes or amines exemplified above are used, a preferred amount thereof and a preferred temperature used therefor are practically the same as those employed in the case of the alcohols.

Examples of other electron donors which can be used in combination with the above-mentioned magnesium compound-solubilizing donors include organic acid esters, organic acid halides, organic acid anhydrides, ethers, ketones, tertiary amines, phosphorous acid esters, phosphoric acid esters, phosphoric acid amides, carboxylic acid amides and nitriles. Concrete examples of these electron donors are those similar to the electron donors (iii) having no active hydrogen as will be mentioned later.

The above-mentioned solution of the magnesium compound in hydrocarbon can also be formed by dissolving in the hydrocarbon another magnesium compound convertible into the above-mentioned magnesium compound or magnesium metal while converting said another magnesium compound or metal into the above-mentioned magnesium compound. For example, the solution of a halogen-containing magnesium compound having no reducing ability in hydrocarbon can be formed by dissolving or suspending a magnesium compound having a group such as alkyl, alkoxy, aryloxy, acyl, amino or hydroxy, magnesium oxide or magnesium metal in a hydrocarbon solvent having dissolved therein the above-mentioned alcohol, amine, aldehyde or carboxylic acid while halogenating said magnesium compound, magnesium oxide or magnesium metal with a halogenation agent such as hydrogen halide, silicon halide or halogen. Furthermore, a magnesium compound having no reducing ability can be solubilized in a hydrocarbon solvent by treatment with a compound capable of annihilating reducing ability, such as an alcohol, ketone, ester, ether, acid halide, silanol or siloxane, of a Grignard reagent, dialkylmagnesium, magnesium hydride or a complex compound thereof with another organometallic compound, for example, such a magnesium compound having reducing ability as represented by the formula

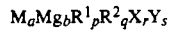

$$M_a Mg_b R^1_p R^2_q X_r Y_s$$

wherein M represents aluminum, zinc, boron or beryllium atom, $R^1$ and $R^2$ each represent a hydrocarbon group, X and Y each represent the group $OR^3$, $OSiR^4R^5R^6$, $NR^7R^8$ or $SR^9$ in which $R^3$, $R^4$, $R^5$, $R^6$, $R^7$ and $R^8$ each represent hydrogen or a hydrocarbon group, and $R^9$ represents a hydrocarbon group, a, b>0, p, q, r, s≦0, b/a≦0.5, and when the number of valence of M is taken as m, the equation $p+q+r+s=ma+2b$ is satisfied, and the relation $0≦(r+s)/(a+b)<1.0$ is established.

In preparing the aforementioned catalyst, it is essential to use the magnesium compound having no reducing ability, but this does not mean that a combination use of the magnesium compound having reducing ability should totally be excluded in that case. In many cases, however, the combination use of the magnesium compound having reducing ability in a large amount is found to be unfavorable.

It is also possible to use a solution of the magnesium compound in an electron donor used as a solvent. Preferred examples of such electron donors as used for this purpose are alcohols, amines, aldehydes and carboxylic acids as exemplified previously, and alcohols are preferred in particular. Examples of other electron donors include phenols, ketones, esters, ethers, amides, acid anhydrides, acid halides, nitriles and isocyanates. The magnesium compound may be dissolved in such an electron donor solution as mentioned above under the conditions corresponding generally to those employed in the case of dissolving the magnesium compound in the hydrocarbon solvent using the electron donor as mentioned previously. Generally, however, in this case the system must be maintained at high temperatures. Accordingly, from the viewpoint of preparing catalysts, catalysts of high performance can be easily obtained when the solution of the magnesium compound in hydrocarbon is used.

The titanium compounds (ii) used in the preparation of the solid titanium catalyst component [A] include, for example, tetravalent titanium compounds represented by the formula $Ti(OR)_gX_{4-g}$ (wherein R is a hydrocarbon group, X is halogen, and $0 \leq g \leq 4$). More particularly, these titanium compounds include titanium tetrahalides such as $TiCl_4$, $TiBr_4$ and $TiI_4$;

alkoxytitanium trihalides such as $Ti(OCH_3)Cl_3$, $Ti(OC_2H_5)Cl_3$, $Ti(O-n-C_4H_9)Cl_3$, $Ti(OC_2H_5)Br_3$ and $Ti(O-iso-C_rH_9)Br_3$;

dialkoxytitanium dihalides such as $Ti(OCH_3)_2Cl_2$, $Ti(OCH_2H_5)_2Cl_2$, $Ti(O-n-C_4H_9)_2Cl_2$ and $Ti(OC_2H_5)_2Br_2$;

trialkoxytitanium monohalides such as $Ti(OCH_3)_3Cl$, $Ti(OC_2H_5)_3Cl$, $Ti(O-n-C_4H_9)_3Cl$ and $Ti(OC_2H_5)_3Br$; and tetraalkoxytitanium such as $Ti(OCH_3)_4$, $Ti(OC_2H_5)_4$, $Ti(O-n-C_4H_9)_4$, $Ti(O-iso-C_4H_9)_4$ and $Ti(O-2-ethylhexyl)_4$.

Of these titanium compounds exemplified above, preferred are halogen-containing titanium compounds, in particular, titanium tetrahalides and especially titanium tetrachloride. These titanium compounds may be used either singly or in admixture of two or more, and also they may be diluted, before use, with hydrocarbon compounds or halogenated hydrocarbon compounds.

The electron donors (iii) having no active hydrogen used in the preparation of the solid titanium catalyst component [A] as described above include organic acid esters, organic acid halides, organic acid anhydrides, ethers, ketones, tertiary amines, phosphorous acid esters, phosphoric acid esters, phosphoric acid amides, carboxylic acid amides, nitriles, etc. Concrete examples of such electron donors as mentioned above include:

ketones of 3–15 carbon atoms such as acetone, methyl ethyl ketone, methyl isobutyl ketone, acetophenone, benzophenone and benzoquinone;

aldehydes of 2–15 carbon atoms such as acetaldehyde, propionaldehyde, octylaldehyde, benzaldehyde, toluylaldehyde and naphthoaldehyde;

organic acid esters of 2–30 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, n-butyl maleate, diisobutyl methylmalonate, di-n-hexyl cyclohexenedicarboxylate, diethyl nadate, diisopropyl tetrahydrophthalate, diethyl phthalate, diisobutyl phthalate, di-n-butyl phthalate, di-2-ethylhexyl phthalate, γ-butyrolactone, δ-valerolactone, coumarin, phthalide and ethylene carbonate;

acid halides of 2–15 carbon atoms such as acetyl chloride, benzoyl chloride, toluylic acid chloride and anisic acid chloride;

ethers and diethers each having 2–20 carbon atoms such as methyl ether, ethyl ether, isopropyl ether, butyl ether, amyl ether, tetrahydrofuran, anisole and diphenyl ether epoxy-p-methane, acid amides such as acetamide, benzamide and toluylic acid amide;

amines such as methylamine, ethylamine, diethylamine, tributylamine, piperidine, tribenzylamine, aniline, pyridine, picoline and tetramethylenediamine; and nitriles such as acetonitrile, benzonitrile and tolunitrile. These electron donors as exemplified above may be used either singly or in combination of two or more. Of these electron donors, preferred are organic acid esters particularly aromatic carboxylic acid esters. It is not always necessary to use these electron donors as starting substances, and they can also be formed in the course of a process for the preparation of the solid titanium catalyst component [A]. These electron donors may also be used in the form of addition compounds or complex compounds with other compounds.

The solid titanium catalyst component [A] as mentioned above can be obtained (a) by bringing the above-mentioned magnesium compound (i) in a liquid state having no reducing ability into contact with the titanium compound in a liquid state (ii) in the presence of the electron donor (iii) having no active hydrogen.

This solid titanium catalyst component [A] may also be obtained (b) by bringing the above-mentioned (i) into contact with the above-mentioned (ii), followed by contact with the above-mentioned (iii).

In the procedure (a) mentioned above, when an electron donor has been contained in the above-mentioned (i) and/or the above-mentioned (ii), no further addition of the electron donor (iii) is necessary when said (i) and (ii) are brought into contact with each other. However, it is also possible to add in advance the electron donor (iii) to the (i) and/or the (ii), and said (i) and (ii) are brought into contact with each other while further adding the (iii) thereto.

The electron donor (iii) may be contained magnesium compound (i) in a liquid state by simply mixing it with the solution of said magnesium compound, or by previously adding said electron donor (iii) in advance to the solvent in which the magnesium compound is to be dissolved.

For example, an excessive electron donor having no active hydrogen is added to a hydrocarbon solution containing an alkylmagnesium compound having reducing ability to annihilate the reducing ability thereof, or a mixture of an electron donor having active hydrogen and an electron donor having no active hydrogen is added to the above-mentioned hydrocarbon solution to decrease the reducing ability thereof. The resultant product is solubilized in a hydrocarbon solvent by the procedure as mentioned previously. It is also possible in that case that instead of using the electron donor (iii) itself from the start, a compound capable of being converted into the electron donor (iii) is added and allowed to undergo reaction in situ to form said electron donor (iii).

The amount of the electron donor (iii) used is 0.01–10 moles, preferably 0.01–1 mole and especially 0.1–0.5 mole per mole of the magnesium compound used. Even when the electron donor is used in a large amount, the solid catalyst component of high performance is obtained if the amount of the titanium compound used is controlled. However, the use of the electron donor (iii) in such proportion as defined above is preferable.

The titanium compound in a liquid state (under contact conditions) is a liquid titanium compound itself or a solution of the titanium compound in hydrocarbon. The electron donor (iii) or a compound capable of being converted into the electron donor (iii) in a process of reaction may also be contained in the titanium compound in a liquid state at the time of contact. In this case, however, it is preferable to use the titanium compound in a large amount so that a free titanium compound which does not form a complex compound with the electron donor (iii) is present in the system. That is, it is desirable to use the titanium compound in an amount, based on 1 mole of the electron donor (iii), in excess of 1 mole, preferably in the proportion of at least 5 moles. The amount of the titanium compound used must be sufficient for forming a solid product thereof on contact without applying a special separation means. When the amount of the titanium compound used is small, no precipitation occurs by the contact between the two. The amount of the titanium compound to be used, though it varies according to the kind thereof, contact conditions employed or the amount of the electron donor used, is at least about 1 mole, usually from about 5 to about 200 moles and preferably from about 10 to about 100 moles, based on 1 mole of magnesium compound. The titanium compound is preferably used in an amount, based on 1 mole of the electron donor (iii), of at least about 1 mole, preferably at least about 5 moles.

In preparing the solid titanium catalyst component [A], the magnesium compound (i) in a liquid state having no reducing ability and the titanium compound (ii) in a liquid state are brought into contact with each other by any of the aforementioned procedures for mixing the magnesium compound with the titanium compound in a liquid state. In this case, the resulting solid titanium catalyst component sometimes varies in shape or size according to the contact conditions employed. Of the procedures as aforementioned, preferred is a procedure wherein the titanium compound in a liquid state and the magnesium compound in a liquid state are mixed together at such a sufficiently low temperature that a solid product is not formed rapidly by the contact between the two compounds, and the temperature is then elevated so that the solid product is formed gradually. According to this procedure, it is easy to obtain a granular or spherical solid catalyst component relatively large in particle size. In this procedure, moreover, when an appropriate amount of the electron donor (iii) having no active hydrogen is allowed to present in the system, there is obtained a granular or spherical solid catalyst component further improved in particle size distribution. The polymer obtained by the use of a catalyst containing such a solid titanium catalyst component as mentioned above is granular or spherical in shape, large in particle size distribution and bulk density, and favorable to flowability. The term granular used herein is intended to mean the shape of a solid product as if it were formed by agglomeration of fine particles when viewed from an enlarged photograph thereof. There can be obtained solid catalyst components in the shape of granules the surface of which ranges from a rugged one having many protrusions and recesses to one close to a true sphere depending on the process for preparing the solid catalyst component employed.

The temperature at which the titanium compound in a liquid state and the magnesium compound in a liquid state are brought into contact with each other is, for example, a temperature of from about $-70°$ to about $+200°$ C. In this case, the two compounds in a liquid state to be brought into contact with each other may be different in temperature from each other. Generally, the solid catalyst component having a favorable shape of granules or spheres and a high performance is obtained in many cases by the aforementioned procedure wherein the titanium compound in a liquid state and the magnesium compound in a liquid state are brought into contact with each other at a relatively low temperature, for example, a temperature of from about $-70°$ to $+50°$ C. In this case, the solid product may not be separated by the contact of the two compounds when the contact temperature is low. In such a case, the solid product is allowed to precipitate by reaction at a temperature elevated to about 50° to about 150° C., or by prolonging the contact time. The solid product thus separated is desirably washed at least once at a temperature of from about 50° to about 150° C. with a titanium compound in a liquid state, more preferably with excessive titanium tetrachloride. Thereafter, the solid titanium catalyst component thus obtained is usually washed with hydrocarbon and then used in the preparation of the olefin polymerization catalyst of the present invention.

This procedure is an excellent procedure since the solid catalyst component having high performance is obtained by simple operation.

In the aforementioned procedure (b), the solid titanium catalyst component [A] is prepared in the following manner.

A suspension containing a solid product is obtained by bringing the magnesium compound in a liquid state into contact with the titanium compound in a liquid state under the same conditions as employed in the procedure (a) mentioned previously. Generally, the electron donor (iii) is added to the suspension and allowed to react therewith at a temperature, for example, from about 0° to about 150° C. The amount of the electron donor (iii) used in this case is the same as that used in the procedure (a).

Furthermore, the above-mentioned procedure (b) may also be used in combination with the procedure (a). According to this combined procedure, the shape and particle size of the resulting solid product can be adjusted to as desired by virtue of the procedure (a), and the micro-adjustment control of the resulting catalyst component can be made by virtue of the procedure (b). In one embodiment of this combined procedure, the magnesium compound in a liquid state and the titanium compound in a liquid state are brought into contact with each other in the coexistence of the electron donor (iii), and in the course of and after the separation of the solid product, the thus separated solid product is further brought into contact with the electron donor (iii) by adding the (iii).

The solid titanium catalyst component [A] obtained by each procedure as mentioned above preferably is thoroughly washed with hydrocarbon, and used for the polymerization.

The solid titanium catalyst component [A] thus obtained desirably has a magnesium/titanium ratio (atomic ratio) of usually about 2-100, preferably about 4-50 and especially about 5 to about 30, a halogen/titanium ratio (atomic ratio) of usually about 4-100, preferably about 5-90 and especially about 8 to about 50, and an electron donor/titanium ratio (molar ratio) of usually about 0.01-100, preferably about 0.2 to about 10 and especially about 0.4 to about 6.

As mentioned previously, this solid titanium catalyst component, in most cases, is granular or almost spherical in shape, and has a specific surface area of usually about at least 10 m²/g preferably about 100-1000 m²/g.

The organometallic compound catalyst component [B] is illustrated hereinafter.

There can be utilized the organoaluminum compound catalyst component [B] of a metal belonging to Group I to III in the periodic table, having at least one Al-carbon bond in the molecular. Example of the compound include organoaluminum compounds represented by the following formula (1)

$$R^1_m Al(OR^2)_n H_p X_1 \quad (1)$$

wherein $R^1$ and $R^2$ may be the same or different and represent independently a hydrocarbon group having normally 1 to 15 carbon atoms, preferably 1 to 4 carbon atoms; X is halogen; and m, n, p and q are numbers satisfying $0<m\leq 3$, $0\leq n<3$, $0\leq p<3$, $0\leq q<3$ and $m+n+p+q=3$;

complex alkyl compounds of aluminum with Group 1 metals of the periodic table, represented by the following formula (2)

$$M^1 AlR^1_4 \quad (2)$$

wherein
$M^1$ is Li, Na or K, and $R^1$ is as defined above; and
dialkyl compounds of Group II metals represented by the following formula

$$R^1 R^2 M^2 \quad (3)$$

wherein $R^1$ and $R^2$ are as defined above, and $M^2$ is Mg, Zn or Cd.

Examples of the organoaluminum compounds having the formula (1) include:

compounds having the general formula $R^1_m Al(OR^2)_{3-m}$ wherein $R^1$ and $R^2$ are as defined above, and m is a number preferably satisfying $1.5 \leq m \leq 3$;

compounds having the general formula $R^1_m AlX_{3-m}$ wherein $R^1$ is as defined above, X is halogen, and m is a number preferably satisfying $0<m<3$;

compounds having the general formula $R^1_m AlH_{3-m}$ wherein $R^1$ is as defined above, and m is a number preferably satisfying $2 \leq m <3$; and compounds having the general formula $R^1_m Al(OR^2)_n X_q$ wherein $R^1$ and $R^2$ are as defined above, X is halogen, and m, n and q are numbers satisfying $0 m \leq 3$, $0 \leq n<3$, $0 \leq q<3$ and $m+n+q=3$.

Concrete examples of the aluminum compounds having the formula (1) include trialkylaluminum compounds such as triethylaluminum and tributylaluminum;

trialkenylaluminum compounds such as triisoprenylaluminum;

dialkylaluminum alkoxides such as diethylaluminum ethoxide and dibutylaluminum butoxide;

alkylaluminum sesquialkoxides such as ethylaluminum sesquiethoxide and butylaluminum sesquibutoxide;

partially alkoxylated alkylaluminum compounds such as those having an average composition represented, for example, by the formula $R^1_{2.5}Al(OR^2)_{0.5}$;

dialkylaluminum halides such as diethylaluminum chloride, dibutylaluminum chloride and diethylaluminum bromide;

alkylaluminum sesquihalides such as ethylaluminum sesquichloride, butylaluminum sesquichloride and ethylaluminum sesquibromide;

partially halogenated alkylaluminum compounds such as alkylaluminum dihalides, for example, ethylaluminum dichloride, propylaluminum dichloride and butylaluminum dibromide;

dialkylaluminum hydrides such as diethylaluminum hydride and dibutylaluminum hydride;

partially hydrogenated alkylaluminum compounds such as alkylaluminum dihydrides, for example, ethylaluminum dihydride and propylaluminum dihydride; and partially alkoxylated and halogenated alkylaluminum compounds such as ethylaluminum ethoxychloride, butylaluminum butoxychloride and ethylaluminum ethoxybromide.

Furthermore, the organoaluminum compounds similar to the above-mentioned compounds represented by the formula (1) include organoaluminum compounds in which two or more aluminum atoms are bonded together via, for example, an oxygen atom or a nitrogen atom. Concrete examples of such compounds are as follows:

$(C_2H_5)_2 AlOAl(C_2H_5)_2$, $(C_4H_9)_2 AlOAl(C_4H_9)_2$, and

$$(C_2H_5)_2 AlNAl(C_2H_5)_2,$$
$$|$$
$$C_2H_5$$

and methylaluminoxane.

Examples of the organoaluminum compounds having the formula (2) include $LiAl(C_2H_5)_4$, and $LiAl(C_7H_{15})_4$.

Among the above-exemplified compounds, particularly preferred are trialkylaluminum compounds and alkylaluminum compounds in which two or more aluminum compounds mentioned above are bonded together.

Examples of the compound represented by the above-mentioned formula (3) include diethylzinc and diethylmagnesium. Further, alkylmagnesium halides such as ethylmagnesium chloride is also usable.

Of the compounds represented by the above-mentioned formulas (1), (2) and (3), particularly preferred are trialkylaluminum, alkylaluminum halides or mixtures thereof.

Polymerization of olefin with the olefin polymerization catalyst containing the above-mentioned components [A] and [B] in the present invention is not limited only to copolymerization of ethylene and pentene-1, but it also includes copolymerization of three or more components, for example, ethylene, pentene-1 and small amounts of other α-olefins or polyenes copolymerizable therewith. The other α-olefins usable in this copolymerization include, for example, 2-methylpropylene, butene-1, hexene-1, 4-methylpentene-1, 3-methyl-pentene-1, octene-1, nonene-1, decene-1, undecene-1, and dodecene-1. Further, the polyenes include, for example, butadiene, isoprene, 1,4-hexadiene, dicyclopentadiene and 5-ethylidene-2-norbornene.

The ethylene/pentene-1 copolymers [I] used in the present invention may be prepared using the above-mentioned catalysts by vapor phase polymerization as will be mentioned below.

The vapor phase polymerization of ethylene and pentene-1 is carried out using a polymerizer equipped with a fluidized bed reactor or a stirring fluidized bed reactor.

In this case, the solid titanium catalyst component [A] is used, as it is, or used as a suspension thereof in a hydrocarbon medium or olefin, and the organometallic compound catalyst component [B], either diluted or without dilution, is fed to the polymerization system.

Further, the molecular weight of the resulting polymer can be controlled by the addition of hydrogen to the polymerization system.

In the present invention, it is preferable to use a pre-polymerized catalyst. In carrying out the pre-polymerization, the above-mentioned electron donor catalyst component may also be allowed to exist in the system in addition to the above-mentioned catalyst component [A] and organometallic compound catalyst component [B]. In that case, the electron donor catalyst component may be used in an amount, based on 1 gram atom of titanium of the titanium catalyst component [A], of 0.01-30 moles, preferably 0.1-10 moles and especially 0.5-5 moles. In the pre-polymerization, α-olefin of 2-10 carbon atoms is pre-polymerized in an inert hydrocarbon solvent, in a liquid monomer as a solvent or without using any solvent. It is preferable, however, to carry out the pre-polymerization in the inert hydrocarbon solvent.

The amount of the α-olefin polymer resulting from the pre-polymerization is, based on 1 g of the titanium catalyst component, 0.5-5000 g, preferably 1-1000 g and especially 3-200 g.

The inert hydrocarbon solvents used in the pre-polymerization include aliphatic hydrocarbons such as propane, butane, n-pentane, isopentane, n-hexane, isohexane, n-heptane, n-octane, isooctane, n-decane, n-dodecane and kerosine; alicyclic hydrocarbons such as cyclopentane, methylcyclopentane, cyclohexane and methylcyclohexane; aromatic hydrocarbons such as benzene, toluene and xylene; and halogenated hydrocarbons such as methylene chloride, ethyl chloride, ethylene chloride and chlorobenzene. Of these hydrocarbons exemplified above, preferred are aliphatic hydrocarbons, particularly those of 3-10 carbon atoms.

In the case where an inert solvent or liquid monomer is used in the pre-polymerization, the amount of the titanium catalyst component [A] is, in terms of titanium atom, preferably 0.001 to 500 mmoles, preferably 0.005 to 200 mmoles per liter of the solvent, and the organometallic compound catalyst component [B] is used in such an amount that an Al/Ti ratio (atomic ratio) becomes 0.5 to 500, preferably 1.0 to 50 and especially 2.0 to 20.

The suitable α-olefins used in the pre-polymerization include those of up to 10 carbon atoms, such as ethylene, propylene, butene-1, pentene-1, 4-methylpentene-1, 3-methylpentene-1, heptene-1, octene-1 and decene-1. Of these α-olefins, particularly preferred is ethylene. In carrying out the pre-polymerization, these α-olefins may be homopolymerized on the catalyst component or at least two of them may be copolymerized thereon so long as the manufacture of crystalline polymers is intended.

The polymerization temperature employed in the pre-polymerization varies according to the kind of α-olefin used or the kind of an inert hydrocarbon solvent used, and cannot be defined indiscriminately. Generally, however, the polymerization temperature is from −40° to 80° C., preferably from −20° to 40° C. and especially from −10° to 30° C.

In the pre-polymerization, hydrogen may coexist in the polymerization system.

In the process mentioned above, copolymerization of ethylene and pentene-1 is carried out preferably using the pre-polymerized catalyst as mentioned above. In the copolymerization of ethylene and pentene-1, the ethylene/pentene-1 copolymer [I] is prepared so as to amount to 1,000–100,000 g, preferably 2,000–50,000 g and especially 3,000–30,000 g per gram of the titanium catalyst component [A] contained in the aforesaid catalyst on which α-olefin has been pre-polymerized.

The amount, based on 1 gram atom of titanium in the titanium catalyst component [A], of the organometallic compound catalyst component [B] used in the pre-polymerized catalyst is 1–1000 moles, preferably 3–500 moles and especially 5–100 moles. In that case, other compounds such as an electron donor catalyst component may be used, and the amount, based on 1 gram atom of the metallic atom in the organometallic compound catalyst component [B], of the electron donor catalyst component is up to 100 moles, preferably up to 1 mole and especially from 0.001 to 0.1 mole.

In the copolymerization mentioned above, the polymerization temperature employed is 20°–130° C., preferably 50°–120° C. and especially 70°–110° C., and the polymerization pressure is 1–50 kg/cm$^2$, preferably 2–30 kg/cm$^2$ and especially 5–20 kg/cm$^2$. Further, an inert gas such as methane, ethane, propane, butane or nitrogen may suitably be fed into the polymerization system so as to maintain a gaseous condition inside the system.

In the process of polymerization mentioned above, the polymerization may be carried out by any of the batchwise, semi-continuous and continuous methods.

Ethylene/pentene-1 copolymers used in the invention include not only the ethylene/pentene-1 copolymers [I] obtained by the above-mentioned process but also ethylene/pentene-1 copolymers obtained by processes other than the above-mentioned process or mixtures of these copolymers. The ethylene/pentene-1 copolymers obtained by the other processes are illustrated below.

The ethylene/pentene-1 copolymer used in the invention is heated to 200° C. to a molten state, and the melt is cooled at a cooling rate of 10° C./min and crystallized to obtain a sheet 0.5 mm in thickness as a sample. The sample is then heated from 10° C. to 200° C. at a heating rate of 10° C./min by means of DSC to obtain a DSC melt-peak pattern having three melt peaks (FIG. 2). In contrast thereto, the ethylene/pentene-1 copolymer used in the invention is heated to 200° C. to a molten state, and the melt is ultra-slowly cooled to 50° C. at a cooling rate of 0.31° C./min and crystallized to obtain a sheet 0.5 mm in thickness as a sample (hereinafter the sample thus obtained is called "the ultra-slowly cooled sample"). The sample is then heated from 10° C. to 200° C. at a heating rate of 10° C./min by means of DSC to obtain a DSC melt-peak pattern. The DSC melt-peak pattern of the ultra-slowly cooled sample has two melt-peaks, wherein the ratio of Hh/Hl (Hh: a peak height on the higher temperature side, Hl: a peak height on the lower temperature side) and the density d of the copolymer satisfy the following formula (FIG. 1):

$$0 < Hh/Hl < 80d - 69.0.$$

Of the ethylene/pentene-1 copolymers having such DSC characteristics as mentioned above, the copolymers (hereinafter called the ethylene/pentene-1 copolymers [II]) of which the Hh/Hl ratio satisfies the relation $$60d - 52.0 < Hh/Hl < 80d - 69.0,$$

and the ethylene/pentene-1 copolymers (hereinafter called the ethylene/pentene-1 copolymers [III]) of which the Hh/Hl ratio satisfies the relation $$0 < Hh/Hl < 60d - 52.0$$

may be prepared selectively by suitably selecting the reaction conditions or the catalysts used therefor.

Accordingly, in the preparation of the ethylene/pentene-1 copolymer compositions of the present invention, the use of the ethylene/pentene-1 copolymers [I] obtained by the process mentioned previously, or the use of ethylene/pentene-1 copolymers [II] or [III] obtained by the processes as will be mentioned later can suitably be selected depending on the purposes for which the compositions of the invention are used, the uses or the economical requirement, and these copolymers may be used in combination if desired.

The ethylene/pentene-1 copolymers [II] may be prepared by the so-called "vapor phase polymerization", and the ethylene/pentene-1 copolymers [III] may be prepared by the so-called "solution polymerization".

Illustrated below in detail are the ethylene/pentene-1 copolymers [II], and illustration in detail of the ethylene/pentene-1 copolymers [III] will follow.

The ethylene/pentene-1 copolymers [II] may also be further copolymerized with the same α-olefins or polyenes other than ethylene and pentene-1 as used in the aforementioned ethylene/pentene-1 copolymers [I].

The ethylene/pentene-1 copolymers [II] have a melt flow rate (MFR) of 0.01 to 100 g/10 min, preferably 0.05 to 50 g/10 min. If this MFR of the copolymer is less than 0.01 g/10 min, said copolymer tends to lower its moldability, and molded articles, such as a film, obtained from the copolymer tend to lower its transparency. If MFR of the copolymer exceeds 100 g/10 min, said copolymer tends to lower its mechanical strength.

The ethylene/pentene-1 copolymers [II] have a density of 0.88 to 0.95 g/cm3, preferably 0.89 to 0.94 g/cm$^3$.

The ethylene/pentene-1 copolymers [II] contain 2 to 25% by weight, preferably 4 to 23% by weight and especially 6 to 20% by weight of a structural unit derived from pentene-1 and 75 to 98% by weight, preferably 77 to 96% by weight and especially 80 to 94% by weight of a structural unit derived from ethylene.

The ethylene/pentene-1 copolymers [II] may further contain, as mentioned previously, up to 10% by weight, preferably up to 5% by weight and especially up to 3% by weight of a structural unit derived from α-olefin other than ethylene and pentene-1.

Furthermore, the Hh/Hl ratio determined from the DSC melt-peak pattern of "the ultra-slowly cooled sample" of the ethylene/pentene-1 copolymer [II] and the density d of said copolymer [II] satisfy the following formulas $$60d - 52.0 < Hh/Hl < 80d - 69.0 \quad [5],$$

preferably, $$60d - 52.0 < Hh/Hl < 80d - 69.1 \quad [5'],$$

and especially, $$60d - 51.9 < Hh/Hl < 80d - 69.2 \quad [5'']$$

wherein Hh represents a peak height on the higher temperature side, Hl represents a peak height on the lower temperature side, and d is the density of the copolymer.

The ratio (RS) of the impact strength of a film to the tear strength in the take-off direction of the film 40 μm in thickness obtained by casting the ethylene/pentene-1 copolymer [II] according to the invention having the above-mentioned characteristics satisfies the formula [6]

$$RS \geq -20\log MFR - 1000d + 968 \quad [6],$$

wherein MFR is the melt flow rate of the copolymer and d is the density of the copolymer. preferably, $$RS \geq -20\log MFR - 1000d + 973 \quad [6'],$$

and especially, $$200 \geq RS \geq -20\log MFR - 1000d + 973 \quad [6''].$$

When the ratio (RS) of the impact strength to the tear strength mentioned above is less than ($-20 \log$ MFR$-1000d+968$), the resulting film tends to have poor tear properties, though it has a high impact strength, or the resulting film tends to have poor impact strength, though it has good tear properties.

The cast film 40 μm in thickness obtained by processing the above-mentioned copolymer [II] in the manner mentioned above has an impact strength of usually at least 1000 kg·cm/cm, preferably at least 1200 kg·cm/cm.

It is desirable that the tear strength ($T_{MD}$) of the above-mentioned film in the take-off direction and the melt flow rate (MFR) of the ethylene/pentene-1 copolymer [II] satisfy the relationship represented by the following formula [7]

$$\log T_{MD} \leq -0.37 \log MFR - 5.1d + 6.72 \quad [7],$$

more preferably, $$\log T_{MD} \leq -0.37 \log MFR - 5.1d + 6.65 \quad [7'],$$

and especially, $$\log T_{MD} \leq -0.37 \log MFR - 5.1d + 6.59 \quad [7''].$$

Films excellent in impact strength as well as tear properties can be obtained from the ethylene/pentene-1 copolymers [II] which satisfy the relationship represented by the above formula [7] with respect to the tear strength ($T_{MD}$) of the film in the take-off direction and MFR.

Pressed sheets 2 mm in thickness obtained by molding according to ASTM D 1928 the ethylene/pentene-1 copolymers [II] having MFR of 2.0 to 50 g/10 min have stress cracking resistance [SC resistance (ESCR), measured according to ASTM D 1692, antalocks 100%, 50° C.] of at least 10 hr, and satisfy the relationship represented by the following formula [8-a]

$$ESCR \geq 0.7 \times 10^4 (\log 80 - \log MFR)^3 (0.952 - d) \quad [8\text{-a}]$$

wherein $2.0 \leq MFR \leq 50$, and d represents the density of the copolymer, preferably $$ESCR \geq 0.9 \times 10^4 (\log 80 - \log MFR)^3 (0.952 - d) \quad [8'\text{-a}]$$

and especially $$ESCR \geq 1.1 \times 10^4 (\log 80 - \log MFR)^3 (0.952 - d) \quad [8''\text{-a}].$$

Further, pressed sheets 2 mm in thickness obtained by molding according to ASTM D 1928 the ethylene/pentene-1 copolymers [II] having MFR of 1.0 to 20 g/10 min have stress cracking resistance [SC resistance (ESCR) measured according to ASTM D 1692, antalocks 10%, 50° C.] of at least 20 hr, and preferably satisfy the relationship represented by the following formula [8-b]

$$ESCR \geq 1.4 \times 10^4 (\log 40 - \log MFR)^2 (0.952 - d) \quad [8\text{-b}]$$

wherein $1.0 \leq MFR \leq 20$, and d represents the density of the copolymer, more preferably $$ESCR \geq 1.7 \times 10^4 (\log 40 - \log MFR)^2 (0.952 - d) \quad [8'\text{-b}]$$

and especially $$ESCR \geq 2.0 \times 10^4 (\log 40 - \log MFR)^2 (0.952 - d) \quad [8''\text{-b}].$$

Furthermore, pressed sheets 2 mm in thickness, obtained by molding according to ASTM D 1928 the ethylene/pentene-1 copolymers [II] having MFR of 0.1 to 5 g/10 min have stress cracking resistance [SC resistance (ESCR), measured according to ASTM D 1692, antalocks 10%, 60° C.] of at least 50 hr and preferably satisfy the relationship represented by the following formula [8-c]

$$ESCR \geq 0.50 \times 10^4 (\log 100 - \log MFR)(0.952 - d) \quad [8\text{-c}]$$

wherein $0.1 \leq MFR \leq 5$, and d represents the density of the copolymer, more preferably $$ESCR \geq 0.65 \times 10^4 (\log 100 - \log MFR)(0.952 - d) \quad [8'\text{-c}]$$

and especially $$ESCR \geq 0.80 \times 10^4 (\log 100 - \log MFR)(0.952 - d) \quad [8''\text{-c}].$$

Moreover, it is desirable that the haze (HAZE) of the above-mentioned pressed sheets and the melt flow rate (MFR) of the ethylene/pentene-1 copolymers [II] satisfy preferably the relationship represented by the following formula [9]

$$\log HAZE \leq 15d - 0.45 \log MFR - 12.23 \quad [9]$$

wherein d represents the density of the copolymer, more preferably $$\log HAZE \leq 15d - 0.45 \log MFR - 12.26 \quad [9']$$

and especially $$\log HAZE \leq 15d - 0.45 \log MFR - 12.30 \quad [9''].$$

The pressed sheets 0.5 mm in thickness used for the measurement of the above-mentioned physical properties are prepared from the ethylene/pentene-1 copolymers [II] according to ASTM D 1928.

The measurement of the value of HAZE was conducted according to ASTM D 1003.

The process for the preparation of the ethylene/pentene-1 copolymers [II] is illustrated hereinafter.

The ethylene/pentene-1 copolymers [II] may be prepared by copolymerizing ethylene and pentene-1 under specific conditions in the presence of such olefin polymerization catalysts as will be mentioned below.

Examples of the olefin polymerization catalysts used in the process for the preparation of the ethylene/pentene-1 copolymers [II] include an olefin polymerization catalyst comprising a solid titanium catalyst component [A] for olefin polymerization obtained by reaction of a hydrocarbon-insoluble solid magnesium aluminum composite selected from (A$_1$) or (A$_2$) mentioned below and a tetravalent titanium compound and containing at least titanium atoms in a low valent state in the proportion of at least 10% and having OR group in an amount of from 1 to 15 in terms of OR/Mg (weight ratio), and an organoaluminum compound catalyst component [B], said (A$_1$) representing a solid magnesium.aluminum composite having R$^1$O group and R$^2$ group (R$^1$ and R$^2$ being each a hydrocarbon group) obtained from a magnesium compound in a liquid state formed from a mixture containing a magnesium compound and an electron donor or from a solution of a magnesium compound in a hydrocarbon solvent, and said (A$_2$) representing a solid magnesium aluminum composite containing R$^1$O group and R$^3$ group (R$^3$ being a hydrocarbon group) obtained by reaction of (1) a solid magnesium compound (B) having R$^1$O group or R$^1$OH and obtained from a magnesium compound in a liquid state formed from a mixture containing a magnesium compound and an electron donor or formed from a solution of a magnesium compound in a hydrocarbon solvent or the above-mentioned (A$_1$) with (2) an organometallic compound (C) of a metal belonging to Group I to III of the periodic table.

Hereinafter, this olefin polymerization catalyst and the reaction system using said catalyst are illustrated. In this connection, however, the way of preparing the ethylene/pentene-1 copolymers [II] is not limited only to the catalyst and reaction system using the same, but said copolymer can be prepared by using other catalysts or other reaction systems.

The above-mentioned olefin polymerization solid titanium catalyst component [A] is typically a component which carries a low valent titanium thereon and which is obtained by reaction of a tetravalent titanium compound with a magnesium.aluminum composite having an R$^1$O group and a hydrocarbon group and obtained by reaction among a magnesium compound in a liquid state as a starting material, an organoaluminum compound, an R$^1$O group-forming compound (RI being a hydrocarbon residue) and optionally other reaction reagents.

The magnesium compound in a liquid state used above may be, for example, a solution of the magnesium compound in a hydrocarbon, electron donor or a mixture thereof, or may be a melt of the magnesium compound. The magnesium compounds used for this purpose include magnesium halides such as magnesium chloride, magnesium bromide, magnesium iodide or magnesium fluoride; alkoxymagnesium halides such as methoxymagnesium chloride, ethoxymagnesium chloride, isopropoxymagnesium chloride, butoxymagnesium chloride or octoxymagnesium chloride; aryloxymagnesium halides such as phenoxymagnesium chloride or methylphenoxymagnesium chloride; alkoxymagnesium such as ethoxymagnesium, isopropoxymagnesium, butoxymagnesium or octoxymagnesium; aryloxymagnesium such as phenoxymagnesium or dimethylphenoxy magnesium; and magnesium carboxylate such as magnesium laurate or magnesium stearate. The magnesium compounds used herein may also be complex or composite compounds of the above-mentioned magnesium compounds with other metals, or mixtures thereof. Further, the magnesium compounds used herein may also be mixtures of two or more of these compounds exemplified above.

Of these magnesium compounds exemplified above, preferred are those represented by $MgX_2$, $Mg(OR^5)X$ or $Mg(OR^5)_2$ (wherein X is halogen, and $R^5$ is a hydrocarbon group) such as magnesium halides, alkoxymagnesium halides, aryloxymagnesium halides, alkoxymagnesium or aryloxymagnesium. Of the halogen-containing magnesium compounds, preferred are magnesium chloride, alkoxymagnesium halide and aryloxymagnesium chloride, and especially preferred is magnesium chloride.

The magnesium compound in a liquid state mentioned above is suitably a solution of said magnesium compound in a hydrocarbon solvent or an electron donor, in which said magnesium compound is soluble, or in a mixture thereof. The hydrocarbon solvents used for this purpose include aliphatic hydrocarbons such as pentene, hexane, heptane, octane, decane, dodecane, tetradecane and kerosine; alicyclic hydrocarbons such as cyclopentane, methylcyclopentane, cyclohexane, methylcyclohexane, cyclooctane and cyclohexene; aromatic hydrocarbons such as benzene, toluene, xylene, ethylbenzene, cumene and cymene; and halogenated hydrocarbons such as dichloroethane, dichloropropane, trichloroethylene, carbon tetrachloride and chlorobenzene.

The solution of the magnesium compound in the hydrocarbon solvent may be obtained by various methods, though they vary according to the kind of the magnesium compound and the solvent used, such as a method wherein the two compounds are simply mixed together (for example using $Mg(OR^5)_2$ in which $R^5$ is a hydrocarbon residue having 6-20 carbon atoms as the magnesium compound), a method wherein the above-mentioned mixture is heated, and a method wherein the magnesium compound is mixed with the hydrocarbon solvent in the presence of an electron donor in which said magnesium compound is soluble, for example, alcohol, aldehyde, amine, carboxylic acid or a mixture thereof, or a mixture comprising said mixture and other electron donors, and the resulting mixture is heated if necessary. For example, when a halogen containing magnesium compound is dissolved in the hydrocarbon solvent using alcohol, the amount of the alcohol used, though it varies according to the kind and amount of the hydrocarbon solvent used and the kind of the magnesium compound used, is preferably at least about 1 mole, suitably from about 1 to about 20 moles, more suitably from about 1.5 to about 12 moles, per mole of the halogen-containing magnesium compound. When an aliphatic hydrocarbon and/or an alicyclic hydrocarbon is used as the hydrocarbon solvent in the above case, alcohol is used in the proportion as defined above, wherein the halogen-containing magnesium compound can be solubilized by the use of a relatively small amount of the alcohol, for example, using alcohol having at least 6 carbon atoms in combination with said alcohol in an amount, based on 1 mole of the halogen containing magnesium compound, of more than about 1 mole, preferably more than about 1.5 moles, and the resulting catalyst component comes to have a good shape. For example, when alcohol having not more than 5 carbon atoms is used alone in the above case, it is necessary to use more than about 15 moles of the alcohol per mole of the halogen containing magnesium compound, and no shape of the resulting catalyst component is comparable to that of the catalyst component obtained in the above case.

On the one hand, the halogen-containing magnesium compound may be solubilized in an aromatic hydrocarbon used as the hydrocarbon by the use of the alcohol in such an amount as defined above, irrespective of the kind of the alcohol used.

The halogen-containing magnesium compound and alcohol are brought into contact with each other preferably in a hydrocarbon solvent at a temperature of usually at least room temperature and, according to the kind of the alcohol and hydrocarbon solvent used, at a temperature of at least about 65° C., suitably about 80°-300° C. and more suitably from about 100 to about 200° C. for a period of from about 15 minutes to about 5 hours, preferably from about 30 minutes to about 2 hours.

Preferable as the alcohol used in that case are those having at least 6 carbon atoms, for example, aliphatic alcohols such as 2-methylpentanol, 2-ethylbutanol, n-heptanol, n-octanol, 2-ethylhexanol, decanol, dodecanol, tetradecyl alcohol, undecenol, oleyl alcohol or stearyl alcohol; alicyclic alcohols such as cyclohexanol or methylcyclohexanol; aromatic alcohols such as benzyl alcohol, methylbenzyl alcohol, isopropylbenzyl alcohol, α-methylbenzyl alcohol or α,α-dimethylbenzyl alcohol; and alkoxy-containing aliphatic alcohols such as n-butyl cellosolve or 1-butoxy-2-propanol. Examples of other alcohols include those having up to 5 carbon atoms, such as methanol, ethanol, propanol, butanol, ethylene glycol and methylcarbitol.

The magnesium compound may also be dissolved in an electron donor other than alcohol. Preferred examples of the electron donor used in this case include amines, aldehydes and carboxylic acids. Examples of an electron donor other than those mentioned above include phenols, ketones, esters, ethers, amides, acid anhydrides, acid halides, nitriles and isocyanates. The magnesium compound may be dissolved in the electron donor as exemplified above under the conditions similar to those employed in the case of dissolving the magnesium compound in the hydrocarbon solvent using the electron donor. In this case, however, the system must be maintained at a relatively high temperature, and, therefore, from the technical viewpoint of the preparation of a catalyst, the catalyst component of high performance is easily obtained when the solution of the magnesium compound in the hydrocarbon solvent is used.

Other examples of the magnesium compound in a liquid state include melts of the magnesium compounds. A typical example of the melts is a melt of a complex of halogenated magnesium with such an electron donor as exemplified previously. Suitable as the melt referred to herein is a melt of a halogenated magnesium.alcohol complex represented by $MgX_2 \cdot nR^1OH$ (wherein $R^1$ is a hydrocarbon group, and n is a positive number).

Stated below is the process for the preparation of a solid magnesium.aluminum composite having $R^1O$ group and $R^3$ group (or $R^2$ group) ($R^1$, $R^2$ and $R^3$ being each a hydrocarbon group, and $R^3$ (or $R^2$) being a reducing group bonded directly to magnesium or aluminum atom) from the magnesium compound in a liquid state. The magnesium aluminum composite referred to herein is represented by the empirical formula $Mg_aAl_bR^2_c$ (or (or $R^3c$) $(OR^1)_dX^2_e$ wherein $X^2$ is halogen, and $2a+3b=c+d+e$. Under certain circumstances, other compounds or electron donors may further be bonded to the composite. The magnesium-aluminum composite represented by the above-mentioned empirical formula has an Al/Mg ratio (atomic ratio) of preferably 0.05–1, more preferably 0.08–0.5 and especially 0.12–0.3, contains $R^1O$ group in an amount, based on 1 part by weight of magnesium, of preferably 0.5–15 parts by weight, more preferably 1–10 parts by weight and especially 2–6 parts by weight, and the hydrocarbon group $R^2$ (or $R^3$) in an amount, based on 1 magnesium atom, of preferably 0.01–0.5 equivalent, more preferably 0.03–0.3 equivalent and especially 0.05–0.2 equivalent, and has a $X^2/Mg$ ratio (atomic ratio) of preferably 1–3, more preferably 1.5–2.5.

The process for the preparation of the above-mentioned magnesium aluminum composite is illustrated below in detail.

Concrete examples of a process for manufacturing the magnesium aluminum composite include a process wherein the magnesium compound in a liquid state and an organoaluminum compound are brought into contact with each other to obtain directly said composite.

In this process, at least one of the magnesium compound in a liquid state and organoaluminum compound used is a compound having $R^1O$ group or an $R^1O$ group-forming compound, e.g. a compound having $R^1OH$ group, and, at the same time, a halogen compound must be used.

For example, the desired magnesium composite may be obtained by the reaction between the solution of $MgX_2$ and alcohol, preferably the solution further containing a hydrocarbon, with an alkylaluminum compound, or by the reaction between the solution of $Mg(OR^5)X$ or $Mg(OR^5)_2$ and alcohol, preferably the solution further containing a hydrocarbon, or the solution of $Mg(OR^5)_2$ in a hydrocarbon with an alkylaluminum halide.

The alkylaluminum compounds referred to above include trialkylaluminum such as triethylaluminum or tributylaluminum; trialkenylaluminum such as triisoprenylaluminum; dialkylaluminum alkoxide such as diethylaluminum ethoxide or dibutylaluminum butoxide; alkylaluminum sesquialkoxides such as ethylaluminum sesquiethoxide or butylaluminum sesquibutoxide; partially alkoxylated alkylaluminum having an average composition represented by $R^1_{2.5}Al(OR^2)_{0.5}$, etc.;l dialkylaluminum halides such as diethylaluminum chloride, dibutylaluminum chloride or diethylaluminum bromide; alkylaluminum sesquihalides such as ethylaluminum sesquichloride, butylaluminum sesquichloride or ethylaluminum sesquibromide; partially halogenated alkylaluminum such as alkylaluminum dihalides, for example, ethylaluminum dichloride, propylaluminum dichloride or butylaluminum dibromide; dialkylaluminum hydrides such as diethylaluminum hydride or dibutylaluminum hydride; partially hydrogenated alkylaluminum such as alkylaluminum dihydrides, for example, ethylaluminum dihydride or propylaluminum dihydride; and partially alkoxylated and halogenated alkylaluminum such as ethylaluminum ethoxychloride, butylaluminum butoxychloride or ethylaluminum ethoxybromide.

Further, the alkylaluminum halides may be selected from among the halogen-containing alkylaluminum compounds as exemplified above.

The processes for the preparation of the magnesium aluminum composite as illustrated above include not only a process which comprises bringing the magnesium compound in a liquid state into contact with the alkylaluminum compound in one stage as aforesaid, but also a process which involves a multi-stage contact between the magnesium compound in a liquid state and the alkylaluminum compound, wherein part of said magnesium compound in a liquid state is first brought into contact with said alkylaluminum compound to form a solid magnesium compound, followed by further contact of said solid magnesium compound with an alkylaluminum compound which is the same as or different from the alkylaluminum compound first used. Of the two processes mentioned above, usually the latter multi-stage contact process can easily adjust the particle size of the magnesium compound and the amount of the organic group, and tends to give a catalyst of high performance.

In the process involving such a multi-stage contact as mentioned above, it is also possible that after completion of the first-stage contact, the solid magnesium compound formed thereby is separated from the liquid system, and the thus separated solid magnesium compound proceeds to the subsequent reaction.

Eventually, it is desirable to design that the solid magnesium.aluminum composite obtained by the above-mentioned processes will come to have such composition as defined previously. For this purpose, it is preferable to use the alkylaluminum compound in an appropriate amount at the time of effecting the above-mentioned contact between the magnesium compound and said alkylaluminum compound. For example, in the process involving the two-stage contact, when a solution using an alcohol is used as the magnesium compound in a liquid state, the alkylaluminum compound is used in such an amount that the $R^2$ Al bond of said alkylaluminum compound becomes at least 0.5 equivalent based on 1 equivalent of the hydroxyl group of said alcohol. When the amount of the alkylaluminum compound used becomes excessive, the resulting particles deteriorate in shape, and no granular catalyst is obtained sometimes. On that account, the alkylaluminum compound is used in such an amount, based on 1 equivalent of the hydroxyl group of the alcohol, of 0.5–10 equivalent, preferably 0.7–5 equivalent, further preferably 0.9–3 equivalent and especially 1.0–2 equivalent in terms of the $R^2$-Al bond.

In that case, it is preferable to use trialkylaluminum as the alkylaluminum compound because the solid composite having a good shape is easy to obtain. Other preferred organoaluminum compounds include dialkylaluminum halides, dialkylaluminum hydrides and dialkylaluminum alkoxides.

In the contact between the magnesium compound in a liquid state and alkylaluminum compound, the concentration in the liquid system of the magnesium compound is preferably 0.005–2 mol/l and especially 0.05–1 mol/l.

Precipitation of the magnesium compound takes place, for example, due to formation of an insoluble magnesium compound caused by the reaction of alkylaluminum compound with alcohol. When the precipitation of the magnesium compound proceeds very rapidly, it becomes sometimes difficult to obtain the solid composite excellent in shape and having an appropriate particle size and a narrow particle size distribution. Accordingly the thus separated solid composite cannot sometimes be the optimum carrier for slurry polymerization catalyst. On that account, it is desirable that the above-mentioned contact is effected under mild conditions, while the following conditions are taken into consideration: the contact temperature, the amount or rate of the alkylaluminum compound addition at the time of solid precipitation, the concentration of each compound used, etc.

From the reasons cited above, it is preferable to effect the contact of the magnesium compound in a liquid state with the organoaluminum compound at a temperature of from $-50°$ to $100°$ C. and especially from $-30°$ to $50°$ C., followed by reaction at a temperature of from $0°$ to $200°$ C., preferably from $40°$ to $150°$ C. When the solid magnesium compound is first formed, and the solid magnesium compound thus formed is then brought into contact with the alkylaluminum compound to effect the reaction as aforesaid, the reaction temperature employed therefor is preferably from $0°$ to $250°$ C. and especially from $20°$ to $130°$ C.

In either case, the contact and reaction conditions employed are so designed that RO group and $R^2$ group of the resulting solid magnesium aluminum composite come, respectively, within the range as defined previously, and, at the same time, it is also desirable to select these conditions so that the resulting composite has a particle size of at least 1 $\mu$m, especially at least 5 $\mu$m but up to 100 $\mu$m, a particle size distribution of 1.0–2.0 in terms of geometric standard deviation and a spherical or granular shape.

Further, there can be used an organometallic compound of a metal which belongs to Group I-III of the periodic table other than aluminum, for example, an alkyllithium, alkylmagnesium halide or dialkylmagnesium, instead of the alkylaluminum compound with which the solid magnesium compound first separated is brought into contact, and the magnesium aluminum composite is obtained.

The solid magnesium.aluminum composite may be prepared by processes other than those mentioned previously, for example, a process in which a halogenation agent such as chlorine, hydrogen chloride, silicon tetrachloride or halogenated hydrocarbon is used in any stage where the alkylaluminum compound is used in the previously mentioned processes, and a process in which a halogenation agent is used before or after the use of the alkylaluminum compound. These processes mentioned above are useful as substitution of the process using alkylaluminum halide.

The process using the halogenation agent prior to the use of the alkylaluminum compound is useful as a means for forming a solid magnesium compound containing $R^1O$ group or $R^1OH$ from a magnesium compound in a liquid state. The desired solid magnesium.aluminum composite may be prepared by reaction of the thus formed solid magnesium compound with the alkylaluminum compound. For example, the above-mentioned solid magnesium compound may be prepared by reaction of $MgX_2$, $Mg(OR^5)X$ or $Mg(OR^5)_2$ in a solution containing an alcohol, further preferably a hydrocarbon with the halogenation agent, or by reaction of $Mg(OR^5)_2$ in a hydrocarbon solvent with the halogenation agent.

The solid magnesium compound thus prepared is represented by the empirical formula $MgX_{2-q}(OR^5)_q \cdot n \cdot R^6OH$ ($0 \leq q < 2$, $n \geq 0$), and may optionally form a composite with another compound component in some cases. In this process, the reactants are used in such a proportion that halogen will amount to about 1–1000 equivalent per atom of magnesium present in the magnesium compound. The reaction between the solid magnesium compound thus prepared and the alkylaluminum compound may be carried out according to the procedure of the latter stage of the above-mentioned process involving the multi-stage contact between the solid magnesium compound and the alkylaluminum compound.

Examples of processes other than those illustrated above for the preparation of the solid magnesium compound include a process in which a magnesium compound of the formula $MgX_2$-$q(OR^5)_q$·$nR^6OH$ in a molten state is solidified by cooling, preferably while said molten magnesium compound is dispersed in a hydrocarbon medium.

In any of the processes mentioned above, it is preferable to select the precipitation conditions in such a manner that the resultant solid magnesium compound has a particle size of at least 1 $\mu$m, especially at least 5 $\mu$m but up to 100 $\mu$m, a particle size distribution of 1.0–2.0 in terms of geometric standard deviation, and a spherical or granular shape.

The amount of the reducing group $R^2$ or $R^3$ contained in the solid magnesium aluminum composite obtained by the processes mentioned above is determined by the following procedure.

To a closed flask of about a 200 ml capacity thoroughly purged with dry nitrogen and charged with about 0.5 g of a solid magnesium.aluminum composite is gradually added dropwise with stirring about 25 ml-of water. After the lapse of time of about 20 minutes, the vapor phase and water phase portions in the flask are withdrawn, respectively, by means of a microsyringe, followed by determination of the alkane concentration of each portion by gas chromatography. The measured value of the alkane concentration in each portion is multiplied by the volume of each portion, and the products thus obtained are then summated to obtain a total amount of alkane formed. This total amount is regarded as the total amount of the alkane formed by reaction of the alkyl group present in said composite with water, and can be considered to be the amount of the reducing group present in said composite.

The thus obtained solid magnesium.aluminum composite having $R^1O$ group and the organic reducing group is brought into contact with a tetravalent titanium compound used in such a proportion that a Ti/Mg ratio (atomic ratio) is less than 1, preferably 0.01–0.7 and especially 0.04–0.5 to prepare a solid titanium compound. At least part of titanium supported on this compound has been reduced to a low valent state, for example, a trivalent state.

There are various tetravalent titanium compounds used for the preparation of the solid titanium catalyst component [A], but usually used are those represented by $Ti(OR)_gX_{4-g}$ wherein R is a hydrocarbon group, X is a halogen atom, and $0 \leq g \leq 4$. More concretely, useful tetravalent titanium compounds include titanium tetrahalide such as TiCl$_4$, TiBr$_4$ and TiI$_4$;
alkoxytitanium trihalides such as Ti(OCH$_3$)Cl$_3$,
Ti(OC$_2$H$_5$)Cl$_3$,
Ti(O-n-C$_4$H$_9$)Cl$_3$,
Ti(OC$_2$H$_5$)Br$_3$ or
Ti(O-iso-C$_4$H$_9$)Br$_3$;
dialkoxytitanium dihalides such as Ti(OCH$_3$)$_2$Cl$_2$,
Ti(OC$_2$H$_5$)Cl$_2$,
Ti(O-n-C$_4$H$_9$)$_2$Cl$_2$ or
Ti(OC$_2$H$_5$)$_2$Br$_2$;
trialkoxytitanium monohalide such as Ti(OCH$_3$)$_3$Cl,
Ti(OC$_2$H$_5$)$_3$Cl,
Ti(O-n-C$_4$H$_9$)$_3$Cl or
Ti(OC$_2$H$_5$)$_3$Br; and
tetraalkoxytitanium such as Ti(OCH$_3$)$_4$,
Ti(OC$_2$H$_5$)$_4$,
Ti(O-n-C$_4$H$_9$)$_4$,
Ti(O-iso-C$_4$H$_9$)$_4$ or
Ti(O-2-ethylhexyl)$_4$.

Of these tetravalent titanium compounds as exemplified above, preferred are titanium tetrahalides and alkoxy titanium trihalides, and particularly preferred is the use of alkoxy titaniumtrihalides.

The contact reaction of the solid magnesium aluminum composite with the titanium compound is carried out preferably in a hydrocarbon medium under the conditions selected so that in the end the solid titanium catalyst component resulting from the contact has an R$^7$O group/Mg weight ratio (R$^7$ being a hydrocarbon group) of 0.5–15, preferably 1–10 and especially 2–6. Herein, R$^7$O group is derived from R$^1$O group present in the solid magnesium aluminum composite or from the titanium compound. When the content of R$^7$O group in the solid catalyst component is smaller than the above-defined range, slurry polymerizability in the copolymerization of ethylene becomes poor, and eventually the resulting ethylene copolymer comes to have not a sufficiently narrow composition distribution. If the content of R$^7$O group is larger than the above-defined range, the catalyst component tends to decrease its activity.

The content of R$^7$O group in the titanium catalyst component may be adjusted to the above-mentioned range by selecting the kind and amount of the titanium compound used and the temperature at which the contact of the solid magnesium aluminum composite and the titanium compound is effected. The contact temperature at which the titanium compound is brought into contact with the solid magnesium aluminum composite is usually about 0°–200° C., preferably about 20°–100° C.

In forming the above-mentioned solid product, a porous inorganic and/or organic compound may be allowed to coexist with the starting reactants in the reaction system, thereby depositing the resulting solid product on the surface of said porous compound. In this case, it is also possible that the porous compound is brought into contact in advance with the magnesium compound in a liquid state, and the porous compound containing and retaining said magnesium compound in a liquid state is then brought into contact with the titanium compound in a liquid state. Examples of these useful porous compounds include silica, alumina magnesia, polyolefin and these compound treated with a halogen-containing compound. When a porous compound containing aluminum, magnesium and RO group which are essential components of the present catalyst component is used in the above case; the resulting solid titanium catalyst may have sometimes the composition deviating from the preferred catalyst composition as mentioned previously.

The titanium catalyst component thus obtained is represented by the empirical formula Mg$_r$Al$_s$Ti$_t$(OR$^7$)$_u$X$^1_v$, wherein r, s, t, u, v>0, and X$^1$ is halogen, and may optionally contain other compounds such as a silicon compound. The titanium catalyst component has a Ti/MG ratio (atomic ration) of usually 0.01–0.5, preferably 0.02–0.2, an Al/Mg ratio (atomic ratio) of 0.05–1. preferably 0.08–0.5 and especially 0.12–0.3, an X$^1$/Mg ratio (atomic ratio) of 1.5–3, preferably 2–2.5, an OR$^7$/Mg ratio (weight ratio) of 0.5–15, preferably 1–10 and especially 2–6, and a specific surface area of 50–1000 m$^2$/g, preferably 150–500 m$^2$/g. Further, 10–100% of all Ti exhibits a valence lower than Ti$^{4+}$.

The solid titanium catalyst component [A] as illustrated above may be used in combination with an organoaluminum compound catalyst component [B] in the polymerization of olefin.

The organoaluminum compound catalyst component [B] mentioned above may be selected from among the alkylaluminum compounds which have already been exemplified as those capable of being used in the preparation of the solid titanium catalyst component.

Of the alkylaluminum compounds referred to above, preferred are trialkylaluminum and alkylaluminum halides or mixtures thereof.

Polymerization of olefin with an olefin polymerization catalyst containing the solid component [A] and the component [B] as mentioned above includes not only the copolymerization of ethylene and pentene-1 but also the copolymerization of three or more components such as ethylene, pentene-1 and small amounts of other α-olefins or polyenes. The above-mentioned olefin polymerization catalyst is useful particularly when ethylene and pentene-1 are copolymerized in the vapor phase.

The polymerization reaction is carried out in the vapor phase, and this reaction can be carried out using a fluidized bed reactor, stirring bed reactor, stirring bed fluid reactor or tube reactor.

The tube titanium catalyst component [A] is used in powder form or after suspending it in a hydrocarbon medium or olefin, and the organoaluminum compound catalyst component [B] is fed to the polymerization system after dilution with a proper diluent or fed, as it is, to said system without dilution.

Further, the molecular weight of the resulting polymer can be controlled by feeding hydrogen to the polymerization system.

In the present invention, it is preferable to use a pre-polymerized catalyst. In carrying out the pre-polymerization, the electron donor catalyst component mentioned previously can be used in addition to the catalyst component [A] and the above-mentioned organoaluminum compound catalyst component [B]. In that case, the amount of the electron donor catalyst component used is 0.01–30 moles, preferably 0.1–10 moles and more preferably 0.5-5 moles based on 1 gram atom of titanium present in the titanium catalyst component [A]. The pre-polymerization is to pre-polymerize an α-olefin of 2-10 carbon atoms on the catalyst in an inert hydrocarbon solvent, a liquid monomer as a solvent or in the absence of any solvent, and the pre-polymerization carried out in the inert hydrocarbon solvent is preferred.

In the pre-polymerization, the amount of α-olefin polymerized is 0.5-5000 g, preferably 1-1000 g and more preferably 3-200 g based on 1 g of the titanium catalyst component used.

The inert hydrocarbon solvents sued in the pre-polymerization include aliphatic hydrocarbons such as propane, butane, n-pentane, isopentane, n-hexane, isohexane, n-heptane, n-octane, isooctane, n-decane, n-dodecane and kerosine; alicyclic hydrocarbons such as cyclopentane, methylcyclopentane, cyclohexane and methylcyclohexane; aromatic hydrocarbons such as benzene, toluene and xylene; and halogenated hydrocarbons such as methylene chloride, ethyl chloride, ethylene chloride and chlorobenzene. Of these hydrocarbons as exemplified above, preferred are aliphatic hydrocarbons, particularly those of 3-10 carbon atoms.

When the inert solvent or the liquid monomer as an inert solvent is used in the pre-polymerization, the titanium catalyst component [A] is used in an amount, per liter of the solvent, of 0.001-500 mmoles, particularly preferably 0.005-200 mmoles in terms of titanium atom, and the organoaluminum compound [B] is used in such a proportion that the Al/Ti ratio (atomic ratio) becomes 0.5-500, preferably 1.0-50 and especially 2.0-20.

The α-olefins used in the pre-polymerization include those having up to 10 carbon atoms, such as ethylene, propylene, butene-1, pentene-1, 4-methylpentene-1, 3-methyl-pentene-1, heptene-1, octene-1 and decene-1. Of these α-olefins, ethylene is particularly preferred. In carrying out the pre-polymerization, these α-olefins may be homopolymerized independently, or two or more α-olefins may be copolymerized, so long as the resulting pre-polymerized catalyst is intended to prepare crystalline polymers.

The polymerization temperature employed in the pre-polymerization varies according to the kind of α-olefin and inert hydrocarbon solvent used, and cannot be defined indiscriminately. The temperature is, however, commonly from $-40°$ to $80°$ C., preferably from $-20°$ to $40°$ C. and especially from $-10°$ to $30°$ C.

In the pre-polymerization, hydrogen may be allowed to coexist in the polymerization system.

Further, the pre-polymerization may be carried out by any of the batchwise and continuous methods, but the continuous method is preferred when the pre-polymerization on a large scale is required.

In the present invention, it is preferable to carry out the copolymerization of ethylene and pentene-1 with the aforementioned catalyst which has been subjected to pre-polymerization. The pre-polymerized catalyst may be fed to the vapor phase polymerizer in a powder state, or in a suspension in a hydrocarbon solvent as aforesaid. The pre-polymerized catalyst is desirably suspended particularly in a low boiling-point solvent such as propane, isobutane, n-butane or isopentane, and fed to the polymerization system. By carrying out copolymerization of ethylene and pentene-1 with the olefin polymerization catalyst containing the above-mentioned pre-polymerized titanium catalyst component [A], an ethylene/pentene-1 copolymer is prepared in an amount, based on 1 g of said titanium catalyst component [A], of 1,000-100,000 g, preferably 2,000-50,000 g and especially 3,000-30,000 g.

In the olefin polymerization catalyst, the organoaluminum compound catalyst component [B] is used in an amount, based on 1 gram atom of titanium present in the titanium catalyst component [A], of 1-1000 moles, preferably 3-500 moles and especially 5-100 moles. Further, the olefin polymerization catalyst may also contain other compounds, for example, the electron donor catalyst component. In that case, the electron donor catalyst component is used in an amount, based on 1 gram atom of the metal element present in the organometallic compound catalyst component [B], of up to 100 moles, preferably up to 1 mole and especially 0.001-0.1 mole.

The copolymerization of ethylene and pentene-1 is carried out at the polymerization temperature of $20°$-$130°$ C., preferably $50°$-$120°$ C. and especially $70°$-$110°$ C. The polymerization pressure employed at that time is 1-50 kg/cm2, preferably 2-30 kg/cm$^2$ and especially 5-20 kg/cm$^2$. Further, an inert gas forming a gaseous state in the polymerization system, such as methane, ethane, propane, butane or nitrogen, may suitably be fed to the polymerization system.

In carrying out the polymerization reaction, the solid titanium catalyst component [A] is used in an amount, based on 1 liter of the reaction volume, of from 0.00001 to about 1 mmol, preferably from about 0.0001 to about 0.1 mmole in terms of Ti atom.

The ethylene/pentene-1 copolymers [III] are now illustrated in detail hereinafter.

The ethylene/pentene-1 copolymers [III] are random copolymers obtained by copolymerization of ethylene and pentene-1 in the presence of the specific catalysts. The ethylene/pentene 1 copolymers [III] may also be further copolymerized, in the same manner as in the case of the ethylene/pentene-1 copolymers [I], with small amounts of other α-olefins or polyenes.

The ethylene/pentene-1 copolymers [III] have a melt flow rate (MFR), as measured according to ASTM D 1238E, of 0.01 to 100 g/10 min, preferably 0.05 to 50 g/10 min. If this MFR is less than 0.01 g/10 min, the resulting copolymer tends to lower its moldability, and molded articles, such as a film, obtained from said copolymer tend to lower its transparency. If this MFR exceeds 100 g/10 min, the resulting copolymer tends to lower its mechanical strength.

The ethylene/pentene-1 copolymers [III] have a density of 0.87 to 0.94 g/cm$^3$, preferably 0.88 to 0.93 g/cm$^3$ as measured according to ASTM D 1505.

The ethylene/pentene 1 copolymers [III] contain 1 to 25% by weight, preferably 4 to 23% by weight and especially 6 to 20% by weight of a structural unit derived from pentene-1, and 75 to 99% by weight, preferably 77 to 96% by weight and especially 80 to 94% by weight of a structural unit derived from ethylene.

The ethylene/pentene-1 copolymers [III] may contain up to 10% by weight, preferably up to 5% by weight and especially up to 3% by weight of a structural unit derived from α-olefins other than ethylene and pentene-1 as mentioned above.

Further, the relationship between the ratio of Hh/Hl as measured from the DSC melt-peak pattern of an "ultra-slowly cooled sample" of the ethylene/pentene-1 copolymer [III] and the density d of the copolymer satisfies the following formula $$0 < Hh/Hl < 60d - 52.0 \qquad [10],$$

preferably, $$0 < Hh/Hl < 40d - 34.5 \quad [10']$$

and especially $$0 < Hh/Hl < 1 \quad [10'']$$

wherein Hh represents a peak height on the higher temperature side, Hl represents a peak height on the lower temperature side, and d represents the density of the copolymer.

The ratio (RS) of the impact strength to the tear strength in the take-off direction of a film 40 μm in thickness obtained by casting the ethylene/pentene-1 copolymer [III] having the above-mentioned characteristics satisfies the following formula [11]

$$RS \geq -20\log MFR - 1000d + 968 \quad [11]$$

wherein MFR represents the melt flow rate of the copolymer, and d represents the density of the copolymer, preferably $$RS \geq -20\log MFR - 1000d + 973 \quad [11']$$

and especially $$200 \geq RS \geq -20\log MFR - 1000d + 975 \quad [11''].$$

When the ratio (RS) of the impact strength to the tear strength is less than $(-20 \log MFR - 1000d + 968)$, the resulting film has poor tear properties, though it has a high impact strength, or the resulting film has a poor impact strength, though it has good tear properties. The film 40 μm in thickness, used for the measurement of the RS value, is a film prepared by molding the ethylene/pentene-1 copolymer [III] into a film by using a T-die film molding machine equipped with an extruder 65 mm in diameter under the following conditions: a resin temperature of 220°-240° C., a chill roll temperature of 30°-40° C., a film-forming rate of 20-30 m/min and a draft ratio (film thickness/lip opening) of 0.05-0.07.

The cast film 40 μm in thickness obtained by processing the copolymer [III] in the manner mentioned above has an impact strength of generally at least 1000 kg·cm/cm, preferably at least 1200 kg·cm/cm.

It is desirable that the tear strength (TMD) of said film in the take-off direction and the melt flow rate (MFR) of the ethylene/pentene-1 copolymer [III] fulfills the relationship represented by the following formula [12]

$$\log T_{MD} \leq -0.37\log MFR - 5.1d + 6.72 \quad [12]$$

wherein d is the density of the copolymer, preferably $$\log T_{MD} \leq -0.37\log MFR - 5.1d + 6.65 \quad [12']$$

and especially $$\log T_{MD} \leq -0.37\log MFR - 5.1d + 6.59 \quad [12''].$$

Films excellent in impact strength as well as tear properties can be obtained from the ethylene/pentene-1 copolymers [III] which fulfills the relationship represented by the above formula [12] with respect to the tear strength ($T_{MD}$) of the film in the take-off direction and MFR.

Pressed sheets 2 mm in thickness obtained by molding the ethylene/pentene-1 copolymers [III] as mentioned above according to ASTM D 1928 have stress cracking resistance [SC resistance (ESCR), measured according to ASTM D 1692, antalocks 100%, 50° C.] of at least 10 hr and satisfy the relationship represented by the following formula [13-a]

$$ESCR \geq 0.7 \times 10^4 (\log 80 - \log MFR)^3 (0.952 - d) \quad [13\text{-a}]$$

wherein $2.0 \leq MFR \leq 50$, and d is the density of the copolymer, preferably $$ESCR \geq 0.9 \times 10^4 (\log 80 - \log MFR)^3 (0.952 - d) \quad [13'\text{-a}]$$

and especially $$ESCR \geq 1.1 \times 10^4 (\log 80 - \log MFR)^3 (0.952 - d) \quad [13''\text{-a}].$$

Further, pressed sheets 2 mm in thickness obtained by molding the ethylene/pentene-1 copolymers [III] according to ASTM D 1928 have stress cracking resistance [SC resistance (ESCR), measured according to ASTM D 1692, antalocks 10%, 50° C] of at least 20 hr, and satisfy the relationship represented by the following formula [13-b]

$$ESCR \geq 1.4 \times 10^4 (\log 40 - \log MFR)^2 (0.952 - d) \quad [13\text{-b}]$$

wherein $1.0 \leq MFR \leq 20$, and d is the density of the copolymer, preferably $$ESCR \geq 1.7 \times 10^4 (\log 40 - \log MFR)^2 (-0.952 - b]$$

and especially $$ESCR \geq 2.0 \times 10^4 (\log 40 - \log MFR)^2 (0.952 - d) \quad [13''\text{-b}].$$

Furthermore, pressed sheets 2 mm in thickness, obtained by molding the ethylene/pentene-1 copolymers [III] according to ASTM D 1928 have stress cracking resistance [SC resistance (ESCR), measured according to ASTM D 1692, antalocks 10%, 60° C] of at least 50 hr and satisfy the relationship represented by the following formula [13-c]

$$ESCR \geq 0.50 \times 10^4 (\log 100 - \log MFR)(0.952 - d) \quad [13\text{-c}]$$

wherein $0.1 \leq MFR \leq 5$, and d is the density of the copolymer, preferably $$ESCR \geq 0.65 \times 10^4 (\log 100 - \log MFR)(0.952 - d) \quad [13'\text{-c}]$$

and especially $$ESCR \geq 0.80 \times 10^4 (\log 100 - \log MFR)(0.952 - d) \quad [13''\text{-c}].$$

Moreover, it is preferred that the haze of the above-mentioned pressed sheets and the melt flow rate (MFR) of the ethylene/pentene-1 copolymers [III] satisfy the relationship represented by the following formula [14]

$$\log HAZE \leq 15d - 0.45 \log MFR - 12.23 \quad [14]$$

wherein d is the density of the copolymer, more preferably $$\log HAZE \leq 15d - 0.45 \log MFR - 12.26 \quad [14']$$

and especially $$\log \text{HAZE} \leq 15d - 0.45 \log \text{MFR} - 12.30 \quad [14''']$$

The pressed sheets 0.5 mm in thickness, used for the measurements of the above-mentioned physical properties, are prepared from the ethylene/pentene-1 copolymers [III] according to ASTM D 1928.

The measurement of HAZE was conducted according to ASTM D 1003.

Now, the process for preparing the ethylene/pentene-1 copolymers [III] is illustrated below in detail.

The ethylene/pentene-1 copolymers [III] may be prepared by copolymerizing ethylene and pentene-1 in the presence of, for example, such catalysts as will be mentioned below.

Examples of the olefin polymerization catalyst which are used in the process for preparing the ethylene/pentene-1 copolymers [III] include olefin polymerization catalysts formed from

[A] a titanium catalyst component in a liquid state comprising a halogen-containing magnesium compound, oleyl alcohol and a titanium compound, and

[B] a halogen-containing organoaluminum compound.

Examples of the halogen-containing magnesium compounds include magnesium chloride, magnesium bromide, magnesium iodide and magnesium fluoride. Of these compounds, magnesium chloride is particularly preferably used.

The titanium compounds include tetravalent titanium compounds represented by the formula $\text{Ti(OR)}_g X_{4-g}$ (wherein R is a hydrocarbon group, X is halogen and g is a number of 0 to 4).

Concrete examples of these titanium compounds include titanium tetrahalides such as $\text{TiCl}_4$, $\text{TiBr}_4$ and $\text{TiI}_4$; alkoxytitanium trihalides such as $\text{Ti(OCH}_3)\text{Cl}_3$,
$\text{Ti(OC}_2\text{H}_5)\text{Cl}_3$,
$\text{Ti(O-iC}_3\text{H}_7)\text{Cl}_3$,
$\text{Ti(O-nC}_4\text{H}_9)\text{Cl}_3$,
$\text{Ti(OC}_2\text{H}_5)\text{Br}_3$,
$\text{Ti(O-iC}_3\text{H}_7)\text{Br}_3$, and
$\text{Ti(O-iC}_4\text{H}_9)\text{Br}_3$;

alkoxytitanium dihalides such as $\text{Ti(OCH}_3)_2\text{Cl}_2$,
$\text{Ti(OC}_2\text{H}_5)_2\text{Cl}_2$,
$\text{Ti(O-iC}_3\text{H}_7)_2\text{Cl}_2$,
$\text{Ti(O-nC}_4\text{H}_9)_2\text{Cl}_2$, and
$\text{Ti(OC}_2\text{H}_5)_2\text{Br}_2$;

trialkoxytitanium monohalides such as $\text{Ti(OCH}_3)_3\text{Cl}$,
$\text{Ti(OCH}_5)_3\text{Cl}$,
$\text{Ti(O-iC}_3\text{H}_7)_3\text{Cl}$,
$\text{Ti(O-nC}_4\text{H}_9)_3\text{Cl}$, and
$\text{Ti(OC}_2\text{H}_5)_3\text{Br}$, and tetraalkoxytitanium compounds such as $\text{Ti(OCH}_3)_4$,
$\text{Ti(OC}_2\text{H}_5)_4$,
$\text{Ti(O-nC}_3\text{H}_7)_4$,
$\text{Ti(O-iC}_3\text{H}_7)_4$,
$\text{Ti(O-nC}_4\text{H}_9)_4$,
$\text{Ti(OC}_6\text{H}_{13})_4$, $\text{Ti(OC}_5\text{H}_{11})_4$,
$\text{Ti(OC}_8\text{H}_{17})_4$,
$\text{Ti[OCH}_2(\text{C}_2\text{H}_5)\text{CHC}_4\text{H}_9]_4$,
$\text{Ti(OC}_9\text{H}_{19})_4$,
$\text{Ti[OC}_6\text{H}_3(\text{CH}_3)_2]_4$,
$\text{Ti(OC}_{18}\text{H}_{35})$,
$\text{Ti(OCH}_3)_2(\text{OCH}_9)_2$,
$\text{Ti(OC}_3\text{H}_7)_3(\text{OC}_4\text{H}_9)$;
$\text{Ti(OC}_2\text{H}_5)_2(\text{OC}_4\text{H}_9)_2$,
$\text{Ti(OC}_2\text{H}_5)_2(\text{O-iC}_3\text{H}_7)_2$,
$\text{Ti(OC}_2\text{H}_5)(\text{OC}_{18}\text{H}_{35})_3$;
$\text{Ti(OC}_2\text{H}_5)_2(\text{OC}_{18}\text{H}_{35})_2$, and
$\text{Ti(OC}_2\text{H}_5)_3(\text{OC}_{18}\text{H}_{35})$.

Of these compounds, the compounds where $2 \leq g \leq 4$ are more preferable. Particularly preferred are tetraalkoxytitanium compounds.

The titanium catalyst component [A] in a liquid state which is used for preparing the ethylene/pentene-1 copolymers III] is a substantially uniform solution comprising the halogen-containing magnesium compound as described above, oleyl alcohol and the titanium compound as described above.

It is preferred that such a titanium catalyst component A] in a liquid state is prepared, for example, by preparing a mixture of a halogen-containing magnesium compound and oleyl alcohol and then bringing the mixture into contact with a titanium compound. The mixture of a halogen-containing magnesium compound and oleyl alcohol may be in the form of a solution or a suspension, but a solution form is preferable. In another preferred embodiment, the titanium catalyst component is prepared by mixing the above-mentioned three ingredients and changing the mixture to a solution state. In the preparation of the titanium catalyst component [A] in a liquid state, the mixture of a halogen-containing magnesium compound and oleyl alcohol is preferably brought into contact with the titanium compound at a temperature of at least 40° C., preferably 40° to 200° C., more preferably 50° to 150° C. for at least one minute, preferably 15 minutes to 24 hours and especially 30 minutes to 15 hours to react them.

Further, the titanium catalyst component [A] in a liquid state may also be prepared by bringing a halogen-containing magnesium compound, oleyl alcohol and a titanium compound simultaneously into contact with one another at a temperature of at least 40° C., preferably 40° to 200° C. and especially 50° to 150° C. for at least one minute, preferably 15 minutes to 24 hours and especially 30 minutes to 15 hours to react them.

In the preparation of the titanium catalyst component in a liquid state which comprises the halogen-containing magnesium compound, oleyl alcohol and the titanium compound, hydrocarbon solvents can also be used.

That is to say, the halogen-containing magnesium and oleyl alcohol are dissolved in a hydrocarbon solvent, and may be brought into contact with the titanium compound. Alternatively, the halogen-containing magnesium compound, oleyl alcohol and the titanium compound are dissolved in a hydrocarbon solvent to thereby bring them into contact with one another.

Examples of such hydrocarbon solvents include aliphatic hydrocarbons such as pentane, hexane, heptane, octane, decane, dodecane, tetradecane and kerosine; alicyclic hydrocarbons such as cyclopentane, methylcyclopentane, cyclohexane, methylcyclohexane, cyclooctane and cyclohexene; aromatic hydrocarbons such as benzene, toluene, xylene, ethylbenzene, cumene and cymene; and halogenated hydrocarbons such as dichloroethane, dichloropropane, trichloroethylene, carbon tetrachloride and chlorobenzene.

Preferably, the halogen-containing magnesium compound, the titanium compound and oleyl alcohol are used in the following amounts.

The ratio by mol of oleyl alcohol/MgCl$_2$ is usually 2 to 4, preferably 2 to 3.

The ratio by mol of the titanium compound/MgCl$_2$ is usually 0.04 to 0.30, preferably 0.05 to 0.20.

The ratio by mol of oleyl alcohol/the titanium compound is 5 to 100, preferably 10 to 80.

The halogen-containing organoaluminum compounds [B] used in the preparation of the ethylene/pentene-1 copolymers [III] include dialkylaluminum halides such as diethylaluminum chloride, dibutylaluminum chloride and diethylaluminum bromide;

alkylaluminum sesquihalides such as ethylaluminum sesquichloride, butylaluminum sesquichloride and ethylaluminum sesquibromide;

partially halogenated alkylaluminum compounds such as ethylaluminum dichloride, propylaluminum dichloride and butylaluminum dibromide; and partially alkoxylated and halogenated alkylaluminum compounds such as ethylaluminum ethoxychloride, butylaluminum butoxychloride and ethylaluminum ethoxybromide.

In addition to these halogen-containing organoaluminum compounds, organoaluminum compounds containing no halogen can be used.

Examples of the organoaluminum compounds containing no halogen which can be used in the present invention include trialkylaluminum compounds such as triethylaluminum and tributylaluminum;

trialkenylaluminum compounds such as triisoprenylaluminum;

dialkylaluminum alkoxides such as diethylaluminum ethoxide and dibutylaluminum butoxide;

alkylaluminum sesquialkoxides such as ethylaluminum sesquiethoxide and butylaluminum sesquibutoxide;

partially alkoxylated alkylaluminum compounds having an average composition represented by the formula $R^1{}_{2.5}Al(OR^2)_{0.5}$, etc.;

dialkylaluminum hydrides such as diethylaluminum hydride and dibutylaluminum hydride; and partially hydrogenated alkylaluminum compounds such as alkylaluminum dihydrides, for example, ethylaluminum dihydride and propylaluminum dihydride.

Further, organoaluminum compounds similar to the above-mentioned compounds include organoaluminum compounds in which two or more aluminum atoms are bonded to each other through an oxygen atom or a nitrogen atom. Concrete examples of such organoaluminum compounds include $(C_2H_5)_2AlOAl(C_2H_5)_2$, $(C_4H_9)_2AlOAl(C_4H_9)_2$,

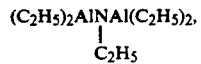

and methylaluminoxane.

Other examples of the organoaluminum compounds containing no halogen include complex compounds of aluminum with Group I metals of the periodic table. Concrete examples of such organoaluminum compounds include $LiAl(C_2H_5)_4$ and $LiAl(C_7H_{15})_4$.

Among the above-described compounds, particularly preferred are trialkylaluminum compounds or alkylaluminum compounds in which two or more aluminum compounds mentioned above are bonded to each other. These organoaluminum compounds containing no halogen can be used in an amount of up to 70 mol %, preferably up to 40 mol % and especially up to 10 mol %, in combination with the halogen-containing organoaluminum compounds.

The ethylene/pentene-1 copolymers [III] are obtained by carrying out polymerization reaction of ethylene with pentene-1 in a hydrocarbon solvent using the above-mentioned catalyst components. Examples of the hydrocarbon solvent include aliphatic hydrocarbons such as pentane, hexane, heptane, octane, decane, dodecane and kerosine and halogenated derivatives thereof; alicyclic hydrocarbons such as cyclohexane, methylcyclopentane and methylcyclohexane and halogenated derivatives thereof; and aromatic hydrocarbons such as benzene, toluene and xylene and halogenated derivatives thereof such as chlorobenzene. Olefin itself which is used in the copolymerization reaction as a copolymerizable monomer can be used as a solvent.

In carrying out the copolymerization reaction, the titanium atom is used in an amount of 0.0005 to about 1 mmol, more preferably about 0.001 to about 0.5 mmol per liter of the reaction volume, and the organoaluminum compound is used in such an amount that the ratio by atom of aluminum/titanium of about 1 to about 2000, preferably about 5 to about 100. The olefin polymerization temperature is about 20° to about 300° C., preferably about 65° to about 250° C. The polymerization pressure is atmospheric pressure to 3000 kg/cm$^2$-G, preferably about 2 to about 100 kg/cm$^2$-G and especially about 5 to about 50 kg/cm$^2$-G.

It is preferable that hydrogen is allowed to coexist in the olefin polymerization system to control the molecular weight.

The polymerization may be carried out continuously or batchwise. Alternatively, the polymerization may also be carried out in two or more stages under different conditions.

In the ethylene/pentene-1 copolymer compositions of the present invention, there may be used as the ethylene/pentene-copolymers (A), for example, the above-mentioned ethylene/pentene-1 copolymers [I], [II] or [III], or mixtures thereof.

ETHYLENE/VINYL ACETATE COPOLYMER (B)

The ethylene/vinyl acetate copolymers (B) used in the present invention have a melt index (at 190° C.) of preferably 0.1 to 30 g/10 min and especially 0.5 to 20 g/10 min, a density of preferably 0.920 to 0.980 g/cm3 and especially 0.930 to 0.960 g/cm3 and a melting point of 100 to 40° C., preferably 95° to 55° C., and contain a structural unit derived from vinyl acetate in an amount of 10 to 50% by weight, preferably 10 to 35% by weight.

COMPOSITION

The present invention is characterized in that the above-mentioned specific ethylene/pentene-1 copolymers are mixed with a small amount of ethylene/vinyl acetate copolymers in order to improve the transparency and hot tack properties of the ethylene/pentene-1 copolymers. When the two polymers are mixed, usually the resulting composition merely shows an average property of both polymers or a property inferior to those of both polymers. It has been quite beyond expectation that the incorporation of the ethylene/vinyl acetate copolymer in a small amount into the ethylene/pentene-1 copolymer has improved the transparency and hot tack properties of the ethylene pentene 1 copolymer without impairing the balance between excellent impact strength and tear properties which are the characteristics of ethylene/pentene-1 copolymer.

The proportion by weight of the ethylene/pentene-1 copolymer to the ethylene/vinyl acetate copolymer in the compositions of the invention is 95:5-65:35, preferably 90:10-70:30. When the ethylene/vinyl acetate copolymer is incorporated in an amount less than 5% by weight, the resulting composition exhibits insufficient improvement in hot tack properties and transparency. When the ethylene/vinyl acetate copolymer is incorporated in an amount greater than 35% by weight, the resulting composition cannot be used since the composition decreases its mechanical strength.

Furthermore, the ethylene/pentene-1 copolymer compositions according to the present invention may be incorporated with rubber components for improving impact strength, or such additives as heat-resistant stabilizers, weathering agents, antistatic agents, slip agents, antiblocking agents, antifogging agents, lubricants, dyestuffs, pigments, natural oil, synthetic oil, wax, etc. These additives are used in suitable amounts. Concrete examples of the stabilizers to be added optionally include phenolic antioxidants such as tetrakis[methylene-3(3,5-di-tert-butyl-4-hydroxyphenyl)-propionate]methane, alkyl $\beta$-(3,5-di-tert-butyl-4-hydroxyphenyl)propionate and 2,2'-oxamidobis[ethyl-3(3,5-di-tert-butyl-4-hydroxyphenyl)]propionate; metal salts of fatty acids such as zinc stearate, calcium stearate and calcium 12-hydroxystearate; and fatty acid esters of polyhydric alcohols such as glycerin monostearate, glycerin monolaurate, glycerin distearate, pentaerythritol monostearate, pentaerythritol distearate and pentaerythritol tristearate. These stabilizers may be incorporated singly or in combination. Examples of the combined use include the use of tetrakis[methylene-3(3,5-di-tert-butyl-4-hydroxyphenyl)propionate]methane, zinc stearate and glycerin monostearate in combination.

In the present invention, it is particularly preferable to use a phenolic antioxidant in combination with a fatty acid ester of a polyhydric alcohol in combination. The fatty acid ester of a polyhydric alcohol is preferably an ester obtained by partially esterifying the alcoholic hydroxyl group of the polyhydric alcohol having a valence of at least 3.

Concrete examples of the fatty acid esters of polyhydric alcohols as mentioned above include fatty acid esters of glycerin such as glycerin monostearate, glycerin monolaurate, glycerin monomyristate, glycerin monopalmitate, glycerin distearate and glycerin dilaurate; and aliphatic acid esters of pentaerythritol such as pentaerythritol monostearate, pentaerythritol monolaurate, pentaerythritol dilaurate, pentaerythritol distearate and pentaerythritol tristearate.

The phenolic antioxidant as mentioned above is used in an amount, based on 100 parts by weight of the above-mentioned ethylene/pentene-1 copolymer composition, of 0-10 parts by weight, preferably 0-5 parts by weight and especially 0-2 parts by weight. The fatty acid ester of a polyhydric alcohol is used in an amount, based on 100 parts by weight of the ethylene/pentene-1 copolymer composition, of 0-10 parts by weight, preferably 0-5 parts by weight.

In the present invention, the ethylene/pentene-1 copolymer compositions may be incorporated with fillers such as silica, diatomaceous earth, alumina, titanium oxide, magnesium oxide, pumice powder, pumice balloons, aluminum hydroxide, magnesium hydroxide, basic magnesium carbonate, dolomite, calcium sulfate, potassium titanate, barium sulfate, calcium phosphite, talc, clay, mica, asbestos, glass fibers, glass flakes, glass beads, calcium silicate, montmorillonite, bentonite, graphite, aluminum powder, molybdenum sulfide, boron fibers, silicon carbide fibers, polyethylene fibers, polypropylene fibers, polyester fibers and polyamide fibers, so long as the incorporation does not impair the object of the invention.

Known methods can be applied to the process for the preparation of the ethylene/pentene-1 copolymer compositions of the invention at the time of the preparation. The known methods include a method for mechanically blending the ethylene/pentene-1 copolymer (A), ethylene/vinyl acetate copolymer (B) and if desired other additive components using an extruder, kneader, etc., a method wherein the above-mentioned components are simultaneously dissolved in a suitable good solvent, for example, hexane, heptane, decane, cyclohexane, benzene, toluene or xylene, or each of the components is separately dissolved in a separate solvent, and the resultant solutions are mixed together, and the solvent is removed, and a method wherein the above-mentioned two methods are combined.

EFFECT OF THE INVENTION

The compositions of the invention are excellent in the balance between tear properties and impact resistance, transparency and hot tack properties, and have excellent characteristics compared with the high-pressure polyethylene. On the one hand, the compositions have good moldability comparable to the high pressure polyethylene, and can be easily molded by a molding machine usually used for high-pressure polyethylene. Accordingly, the compositions are suitable for films such as packaging films, and in addition they can be used for hollow molded articles for liquid carrying containers and composite films prepared by lamination with other films, while the characteristics of the compositions are utilized.

EXAMPLE

The present invention is illustrated below with reference to examples, but it should be construed that the invention is in no way limited to those examples.

EXAMPLE 1

Preparation of Ethylene/Pentene-1 Copolymer

Preparation of Titanium Catalyst Component

Commercially available anhydrous magnesium chloride in an amount of 476 g was suspended in 10 liters of n-decane in a nitrogen atmosphere and then 4.0 kg of oleyl alcohol was added to the suspension. The suspension was stirred at 135° C. for 5 hours to effect reaction and a colorless and transparent liquid was obtained.

The liquid thus obtained was cooled to 110° C., and 0.45 mole of Ti(OC$_2$H$_5$)$_4$ was added thereto. The resulting mixture was allowed to undergo reaction at 110° C. for 5 hours. The liquid thus obtained was stored at room temperature.

Polymerization

To a continuous polymerizer having a capacity of 200 liters were fed continuously dehydrated and purified hexane at a rate of 100 l/h, ethylaluminum sesquichloride at a rate of 19.9 mmol/h and the titanium catalyst component obtained above at a rate of 0.50 mmol/h in terms of Ti atom. Simultaneously, to the polymerizer were fed ethylene at a rate of 13 kg/h, pentene-1 at a rate of 5.4 kg/h and hydrogen at a rate of 9.0 l/h. Copolymerization was carried out under the following conditions: the polymerization temperature of 170° C., the total pressure of 31 kg/cm$^2$-G, the retention tie of 1 hour and the concentration of the resulting copolymer based on the solvent hexane of 105 g/l.

The copolymer obtained had a melt index (190° C.) of 2.2 g/10 min, a density of 0.921 g/cm$^3$ and contained 12% by weight of a structural unit derived from pentene-1. The ratio (RS) of impact strength to tear strength in the take-off direction of said copolymer was 50 (impact strength=3000 kg·cm/cm, tear strength in the take-off direction=60 kg/cm). The Hh/Hl ratio obtained from the DSC melt-peak pattern of said copolymer was 0.65.

Preparation of Composition

The above-mentioned copolymer in which the stabilizer had been incorporated was pelletized by melt extrusion. A mixture of 90 parts by weight of the pellets thus obtained and 10 parts by weight of pellets of an ethylene/vinyl acetate copolymer (melt index 2.5, density 0.950 g/cm$^3$) was mixed together by means of a V-blender.

Molding of Film

Using a commercially available tubular film-forming machine for polyolefin, the composition obtained above was molded into a film 180 mm in width and 0.03 mm in thickness. The molding was carried out under the following conditions: the resin temperature of 180° C., the screw revolution of the extruder of 60 r.p.m., the die diameter of 100 mm, the die slit width of 0.5 mm and cooling by airing operation in one stage.

Evaluation of Film

The molded film was evaluated to determine its tensile characteristics according to ASTM D 882, its impact strength according to ASTM D 3420, its tear strength according to ASTM D 1004 and its transparency according to ASTM D 1003.

Hot tack test was carried out by stacking one specimen on another specimen each 550 mm in length and 20 mm in width, sealing the specimens for 1 second with a seal bar 5 mm in width and 300 mm in length at a temperature of 105° C., 110° C., 120° C., 130° C. or 140° C. under a pressure of 2 kg/cm$^3$, and applying a load of 43 g to each specimen simultaneously with the removal of the sealing pressure to peel the sealed portion forcibly. The hot tack properties were evaluated from the peeled length in mm. That is, the specimen is more excellent in hot tack properties when the peeled length is shorter.

Results obtained are shown in Table 1.

EXAMPLE 2

Example 1 was repeated except that the composition to be prepared was designed to contain 80 parts by weight of the ethylene/pentene-1 copolymer and 20 parts by weight of the ethylene/vinyl acetate copolymer.

Results obtained are shown in Table 1.

EXAMPLE 3

Example 1 was repeated except that the composition to be prepared was designed to contain 70parts by weight of the ethylene/pentene-1 copolymer and 30 parts by weight of the ethylene/vinyl acetate copolymer.

Results obtained are shown in Table 1.

EXAMPLE 4

Example 1 was repeated except that there was used an ethylene/pentene-1 copolymer obtained by varying the feeding rate of ethylene, pentene-1 and hydrogen in Example 1, and having a melt flow rate (190° C.) of 1.6 g/10 min, a density of 0.927 g/cm$^3$, the structural unit derived from pentene-1 in an amount of 9.2% by weight, RS of 41.7 (impact strength=2000 kg·cm/cm, tear strength in the take-off direction=48 kg/cm) and the Hh/Hl ratio, of 0.67.

Results obtained are shown in Table 1.

EXAMPLE 5

Example 1 was repeated except that there was used an ethylene/pentene-1 copolymer obtained by varying the feeding rate of ethylene, pentene-1 and hydrogen in Example 2, and having a melt flow rate (190° C.) of 2.2 g/10 min, a density of 0.935 g/cm$^3$, the structural unit derived from pentene-1 in an amount of 4.1% by weight, RS of 34 (impact strength=1700 kg·cm/cm, tear strength in the take-off direction=50 kg/cm) and the Hl/Hl ratio of 0.73.

Results obtained are shown in Table 1.

COMPARATIVE EXAMPLE 1

Example 1 was repeated except that a film was formed from only the ethylene/pentene-1 copolymer prepared by the procedure as described in Example 1.

Results obtained are shown in Table 1.

COMPARATIVE EXAMPLE 2

Example 1 was repeated except that a film was formed from only the ethylene/pentene-1 copolymer prepared by the procedure as described in Example 4.

Results obtained are shown in Table 1.

COMPARATIVE EXAMPLE 3

Example 1 was repeated except that a film was formed from only the ethylene/pentene-1 copolymer prepared by the procedure as described in Example 5.

Results obtained are shown in Table 1.

COMPARATIVE EXAMPLE 4

Example 1 was repeated except that the composition to be prepared was designed to contain 50 parts by weight of the ethylene/pentene-1 copolymer and 50 parts by weight of the ethylene/vinyl acetate copolymer.

Results obtained are shown in Table 1.

COMPARATIVE EXAMPLE 5

Example 1 was repeated except that in place of the ethylene/pentene-1 copolymer prepared in Example 1, there was used an ethylene/butene-1 copolymer prepared under the conditions mentioned below.

Results obtained are shown in Table 1.

Preparation of Titanium Catalyst Component

Commercially available anhydrous magnesium chloride in an amount of 476 g was suspended in 10 liters of n-decane in a nitrogen atmosphere and then 4.0 kg of oleyl alcohol was added to the suspension. The suspension was stirred at 135° C. for 5 hours to effect reaction and a colorless and transparent liquid was obtained.

The liquid thus obtained was cooled to 110° C., and 0.54 mole of Ti(OC$_2$H$_5$)$_4$ was added thereto. The resulting mixture was allowed to undergo reaction at 110° C. for 5 hours. The liquid thus obtained was stored at room temperature.

Polymerization

To a continuous polymerizer having a capacity of 200 liters were fed continuously dehydrated and purified hexane at a rate of 100 l/h, ethylaluminum sesquichloride at a rate of 21.5 mmol/h and the titanium catalyst component obtained above at a rate of 0.50 mmol/h in terms of Ti atom. Simultaneously, to the polymerizer were fed ethylene at a rate of 13 kg/h, butene-1 at a rate of 3.4 kg/h and hydrogen at a rate of 7.3 l/h. Copolymerization was carried out under the following conditions: the polymerization temperature of 170° C., the total pressure of 31 kg/cm$^2$-G, the retention time of 1 hour and the concentration of the resulting copolymer based on the solvent hexane of 105 g/l.

The copolymer obtained had a melt flow rate (190° C.) of 2.0 g/10 min, a density of 0.921 g/cm$^3$, RS of 20.5 (impact strength=900 kg·cm/cm, tear strength=44 kg/cm) and a Hh/Hl ratio of 0.35.

COMPARATIVE EXAMPLE 6

Example 1 was repeated except that in place of the ethylene/pentene-1 copolymer, there was used an ethylene/hexene-1 copolymer polymerized under the conditions mentioned below.

Results obtained are shown in Table 1.

Preparation of Titanium Catalyst Component

Commercially available anhydrous magnesium chloride in an amount of 476 g was suspended in 10 liters of n-decane in a nitrogen atmosphere and then 4.0 kg of oleyl alcohol was added to the suspension. The suspension was stirred at 135° C. for 5 hours to effect reaction and a colorless and transparent liquid was obtained.

The liquid thus obtained was cooled to 110° C., and 0.43 mole of Ti(OC$_2$H$_5$)$_4$ was added thereto. The resulting mixture was allowed to undergo reaction at 110° C. for 5 hours. The liquid thus obtained was stored at room temperature.

Polymerization

To a continuous polymerizer having a capacity of 200 liters were fed continuously dehydrated and purified hexane at a rate of 100 l/h, ethylaluminum sesquichloride at a rate of 17.2 mmol/h and the titanium catalyst component obtained above at a rate of 0.50 mmol/h in terms of Ti atom. Simultaneously, to the polymerizer were fed ethylene at a rate of 13 kg/h, hexene-1 at a rate of 6.7 kg/h and hydrogen at a rate of 11.3 l/h. Copolymerization was carried out under the following conditions: the polymerization temperature of 170° C., the total pressure of 31 kg/cm$^2$-G, the retention time of 1 hour and the concentration of the resulting copolymer based on the solvent hexane of 105 g/l.

The copolymer obtained had a melt flow rate (190° C.) of 2.0 g/10 min, a density of 0.920 g/cm$^3$, RS of 33 (impact strength=3300 kg·cm/cm, tear strength=110 kg/cm) and a Hh/Hl ratio of 0.82.

COMPARATIVE EXAMPLE 7

Example 1 was repeated except that a film was formed from only the ethylene/butene-1 copolymer prepared by a procedure as described in Comparative Example 5.

Results obtained are shown in Table 1.

COMPARATIVE EXAMPLE 8

Example 1 was repeated except that a film was formed from only the ethylene/hexene-1 copolymer prepared by a procedure as described in Comparative Example 6.

Results obtained are shown in Table 1.

TABLE 1

|  | Ethylene copolymer | | | Ethylene/vinyl acetate copolymer | Physical properties of film | | |
|---|---|---|---|---|---|---|---|
|  | Comonomer | Density (g/cm$^3$) | Amount incorporated parts by weight | Amount incorporated parts by weight | Haze % | Glassiness % | Impact strength kg · cm/cm |
| Example 1 | Pentene-1 | 0.921 | 90 | 10 | 6.0 | 100 | 2500 |
| Example 2 | Pentene-1 | 0.921 | 80 | 20 | 4.9 | 102 | 2800 |
| Example 3 | Pentene-1 | 0.921 | 70 | 30 | 5.3 | 100 | 2800 |
| Example 4 | Pentene-1 | 0.927 | 90 | 10 | 6.2 | 97 | 2700 |
| Example 5 | Pentene-1 | 0.935 | 90 | 10 | 7.5 | 90 | 2000 |
| Comp. Ex. 1 | Pentene-1 | 0.921 | 100 | 0 | 11.0 | 65 | 1700 |
| Comp. Ex. 2 | Pentene-1 | 0.927 | 100 | 0 | 12.0 | 67 | 3000 |
| Comp. Ex. 3 | Pentene-1 | 0.935 | 100 | 0 | 12.2 | 60 | 2100 |
| Comp. Ex. 4 | Pentene-1 | 0.921 | 50 | 50 | 8.0 | 88 | 1700 |
| Comp. Ex. 5 | Butene-1 | 0.921 | 90 | 10 | 6.0 | 97 | 900 |
| Comp. Ex. 6 | Hexene-1 | 9.921 | 90 | 10 | 7.1 | 92 | 2200 |
| Comp. Ex. 7 | Butene-1 | 0.921 | 100 | 0 | 8.9 | 69 | 1000 |
| Comp. Ex. 8 | Hexene-1 | 0.921 | 100 | 0 | 11.0 | 65 | 2900 |

|  | Physical properties of film | | | | | | |
|---|---|---|---|---|---|---|---|
|  | Tear strength MD/TD (kg/cm) | Tensile yield stress MD/TD (kg/cm$^2$) | Hot tack test (mm) | | | | |
|  |  |  | 105° C. | 110° C. | 120° C. | 130° C. | 140° C. |
| Example 1 | 53/120 | 105/90 | — | ≧300 | 38 | 21 | 16 |
| Example 2 | 41/122 | 96/83 | ≧300 | 29 | 18 | 13 | 10 |
| Example 3 | 35/118 | 88/75 | ≧300 | 25 | 15 | 9 | 7 |
| Example 4 | 63/140 | 115/120 | — | ≧300 | 152 | 23 | 12 |
| Example 5 | 50/137 | 123/141 | — | — | ≧300 | 138 | 48 |
| Comp. Ex. 1 | 50/105 | 122/108 | — | — | ≧300 | 45 | 11 |
| Comp. Ex. 2 | 69/139 | 138/145 | — | — | ≧300 | 100 | 40 |

TABLE 1-continued

| | | | | | | | |
|---|---|---|---|---|---|---|---|
| Comp. Ex. 3 | 49/133 | 150/170 | — | — | — | ≧300 | 105 |
| Comp. Ex. 4 | 30/110 | 68/65 | 80 | 15 | 10 | 8 | 18 |
| Comp. Ex. 5 | 48/132 | 100/85 | — | ≧300 | 38 | 20 | 15 |
| Comp. Ex. 6 | 130/205 | 105/94 | — | ≧300 | 40 | 18 | 10 |
| Comp. Ex. 7 | 44/125 | 120/103 | — | — | ≧300 | 40 | 8 |
| Comp. Ex. 8 | 135/200 | 125/110 | — | — | ≧300 | 48 | 15 |

What is claimed is:

1. An ethylene/pentene-1 copolymer composition comprising 95 to 65 parts by weight of
   (A) an ethylene/pentene-1 copolymer obtained by copolymerization of ethylene and pentene-1, said ethylene/pentene-1 copolymer satisfying the following requisites (a) to (d):
   (a) a melt flow rate of the copolymer as measured according to ASTM D 1238E is 0.01-100 g/10 min,
   (b) a density of the copolymer as measured according to ASTM D 1505 is 0.88-0.94 g/cm$^3$,
   (c) the copolymer contains 1-25% by weight of a structural unit derived from pentene-1, and
   (d) in a film 40 μm in thickness obtained by cast film extrusion of the copolymer, the ratio (RS) of impact strength of the film to tear strength of the film in the take-off direction of the film satisfies the following formula $$RS \geq -20\log MFR - 1000d + 968$$

wherein MFR represents the melt flow rate of said copolymer, and d represents the density of said copolymer, and
   5-345 parts by weight of
   (B) an ethylene/vinyl acetate copolymer.

2. The ethylene/pentene-1 copolymer composition as claimed in claim 1, wherein the ethylene/pentene-1 copolymer (A) is obtained by copolymerizing ethylene and pentene-1 in the presence of an olefin polymerization catalyst comprising
   [A] a solid titanium catalyst component containing magnesium, titanium, halogen and an electron donor as its essential ingredients and obtained by bringing (i) a magnesium compound in a liquid state having no reducing ability and (ii) a titanium compound in a liquid state into contact, as they are, with each other, said contact being carried out in the presence of (iii) an electron donor having no active hydrogen, or being followed by contact with said (iii), and
   [B] an organic compound catalyst component of a metal belonging to Group I to III of the periodic table.

3. The ethylene/pentene-1 copolymer composition as claimed in claim 2, wherein the ethylene/pentene-1 copolymer (A) further satisfies the following request:
   in case that the copolymer is melted at 200° C., then slowly; cooled to 50° C. at a cooling rate of 0.31° C./min and crystallized to prepare a sheet sample having a thickness of 0.5 mm, a DSC melt-peak pattern of the sample obtained when the sample is heated from 10° to 200° C. at a heating rate of 10° C./min using DSC has two melt peaks, and a ratio (Hh/Hl) of a height of the peak (Hh) on the higher temperature side to a height of the peak (Hl) on the lower temperature side and the density of the copolymer satisfy the following formula:

$$0 < Hh/Hl < 80d - 69.0$$

wherein Hh represents a peak height on the higher temperature side, Hl represents a peak height on the lower temperature side, and d presents a density of the copolymer.

4. The ethylene/pentene-1 copolymer composition as claimed in claim 1, wherein the ethylene/pentene-1 copolymer (A) is obtained by copolymerizing ethylene and pentene-1 in the presence of an olefin polymerization catalyst comprising
   a solid titanium catalyst component [A] for olefin polymerization obtained by reaction of a hydrocarbon-insoluble solid magnesium.aluminum composite selected from (A$_1$) or (A$_2$) mentioned below and a tetravalent titanium compound and containing at least titanium atoms in a low valent state in the proportion of at least 10% and having OR group in an amount of from 1 to 15 in terms of OR/Mg (weight ratio), and
   an organoaluminum compound catalyst component [B],
   said (A1) representing a solid magnesium.aluminum composite having R$^1$O group and R$^2$ group (R$^1$ and R$^2$ being each a hydrocarbon group) obtained from a magnesium compound in a liquid state formed from a mixture containing a magnesium compound and an electron donor or from a solution of a magnesium compound in a hydrocarbon solvent, and
   said (A$_2$) representing a solid magnesium.aluminum composite containing R$^1$O group and R$^3$ group (R$^3$ being a hydrocarbon group) obtained by reaction of (1) a solid magnesium compound (B) having R$^1$O group or R$^1$OH and obtained from a magnesium compound in a liquid state formed from a mixture containing a magnesium compound and an electron donor or formed from a solution of a magnesium compound in a hydrocarbon solvent, or the above-mentioned (A$_1$) with (2) an organometallic compound (c) of a metal belonging to Group I to III of the periodic table.

5. The ethylene/pentene-1 copolymer composition as claimed in claim 4, wherein the ethylene/pentene-1 copolymer (A) further satisfies the following request;
   in the case that the copolymer is melted at 200° C., then slowly cooled to 50° C. at a cooling rate of 0.31° C./min and crystallized to prepare a sheet sample having a thickness of 0.5 mm, a DSC melt-peak pattern of the sample obtained when the sample is heated from 10° to 200° C. at heating rate of 10° C./min using DSC has two melt peaks, and a ratio (Hh/Hl) of a height of the peak (Hh) on the higher temperature side to a height of the peak (Hl) on the lower temperature side and the density of the copolymer satisfy the following formula:

$$60d - 52.0 < Hh/Hl < 80d - 569.0$$

wherein Hh represents a peak height on the higher temperature side, Hl represents a peak height on the lower temperature side, and d represents a density of the copolymer.

6. The ethylene/pentene-1 copolymer composition as claimed in claim 1, wherein the ethylene/pentene-1 copolymer (A) is obtained by copolymerizing ethylene and pentene-1 in the presence of an olefin polymerization catalyst formed from
 [A] a titanium catalyst component in a liquid form comprising a halogen-containing magnesium compound, oleyl alcohol and a titanium compound, and
 [B] a halogen-containing organoaluminum compound.

7. The ethylene/pentene-1 copolymer composition as claimed in claim 6, wherein the ethylene/pentene-1 copolymer (A) further satisfies the following request:
 in the case that the copolymer is melted at 200° C. then slowly cooled to 50° C. at a cooling rate of 0.31° C./min and crystallized to prepare a sheet sample having a thickness of 0.5 mm, a DSC melt-peak pattern of the sample obtained when the sample is heated from 10° to 200° C. at a heating rate of 10° C./min using DSC has two melt peaks, and a ratio (Hh/Hl) of a height of the peak (Hh) on the higher temperature side to a height of the peak (Hl) on the lower temperature side and the density of the copolymer satisfy the following formula:

$$0 < Hh/Hl < 60d - 52.0$$

wherein Hh represents a peak height on the higher temperature side, Hl represents a peak height on the lower temperature side, and d represents a density of the copolymer.

* * * * *